(12) United States Patent
Omae

(10) Patent No.: US 7,142,227 B2
(45) Date of Patent: Nov. 28, 2006

(54) DRIVING IC AND OPTICAL PRINT HEAD

(75) Inventor: Mitsuhiro Omae, Tottori (JP)

(73) Assignees: Sanyo Electric Co., Ltd., Tottori (JP); Tòttori Sanyo Electric Co., Ltd., Tottori (JP)

( * ) Notice: Subject to any disclaimer, the term of this patent is extended or adjusted under 35 U.S.C. 154(b) by 82 days.

(21) Appl. No.: 10/466,934

(22) PCT Filed: Jan. 21, 2002

(86) PCT No.: PCT/JP02/00395

§ 371 (c)(1), (2), (4) Date: Jul. 22, 2003

(87) PCT Pub. No.: WO02/058934

PCT Pub. Date: Aug. 1, 2002

(65) Prior Publication Data
US 2004/0046854 A1   Mar. 11, 2004

(30) Foreign Application Priority Data
Jan. 24, 2001 (JP) .............................. 2001-15788

(51) Int. Cl.
B41J 2/385 (2006.01)

(52) U.S. Cl. .................................................... 347/132

(58) Field of Classification Search .................... 347/5, 347/9, 12, 15, 132, 234, 248, 130, 237, 238, 347/247, 128, 138
See application file for complete search history.

(56) References Cited

U.S. PATENT DOCUMENTS

| 4,318,597 A | 3/1982 | Kotani et al. |
| 5,274,394 A | 12/1993 | Corona et al. |
| 5,457,488 A * | 10/1995 | Nakamura et al. .......... 347/237 |
| 5,585,836 A | 12/1996 | Pham et al. |
| 5,990,920 A * | 11/1999 | Nagumo et al. ............ 347/237 |
| 6,215,511 B1 * | 4/2001 | Asako et al. ................ 347/234 |

FOREIGN PATENT DOCUMENTS

| JP | 11-138892 | 5/1999 |
| JP | 2000-218854 | * 8/2000 |
| JP | 2000-335001 | 12/2000 |

* cited by examiner

Primary Examiner—Stephen Meier
Assistant Examiner—Geoffrey S. Mruk
(74) Attorney, Agent, or Firm—Arent Fox PLLC

(57) ABSTRACT

From a latch circuit (12) composed of five stages of latch circuits each storing data signals corresponding to one line, data signals to be fed to a drive circuit (16) to light the corresponding light-emitting sections are selected by a select circuit (15) selects according to correction data, consisting of 9 bits for each light-emitting section, stored in a Y position correction data storage circuit (13). This permits adjustment of the timing with which the individual light-emitting sections are lit and thereby helps achieve printing with satisfactory linearity.

18 Claims, 16 Drawing Sheets

FIG.7A
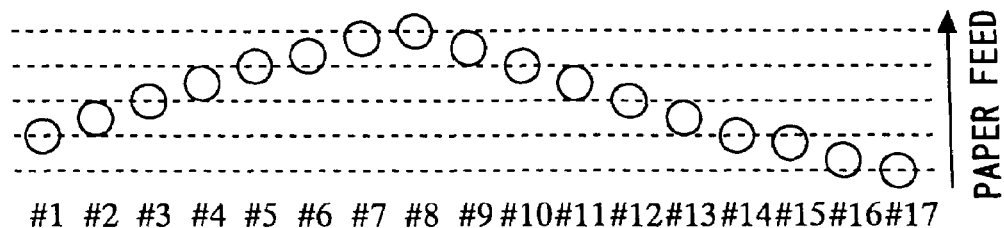
1 #2 #3 #4 #5 #6 #7 #8 #9 #10 #11 #12 #13 #14 #15 #16 #17
FIG.7B
1 #2 #3 #4 #5 #6 #7 #8 #9 #10 #11 #12 #13 #14 #15 #16 #17
db db dc dc dd dd dd de dd dd dc dc db db da da da
FIG.7C
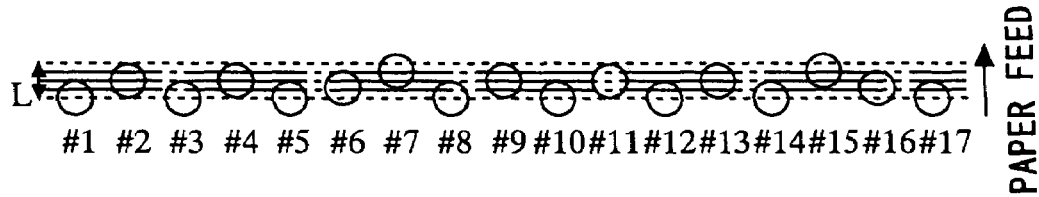
1 #2 #3 #4 #5 #6 #7 #8 #9 #10 #11 #12 #13 #14 #15 #16 #17
FIG.7D
1 #2 #3 #4 #5 #6 #7 #8 #9 #10 #11 #12 #13 #14 #15 #16 #17
ta tc ta tc ta tb td ta tc ta tc ta tc ta td tb ta
FIG.7E
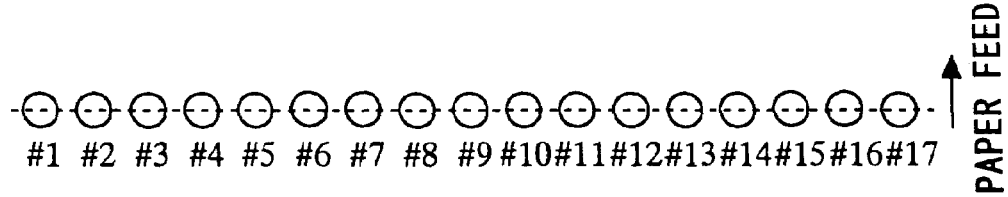
1 #2 #3 #4 #5 #6 #7 #8 #9 #10 #11 #12 #13 #14 #15 #16 #17

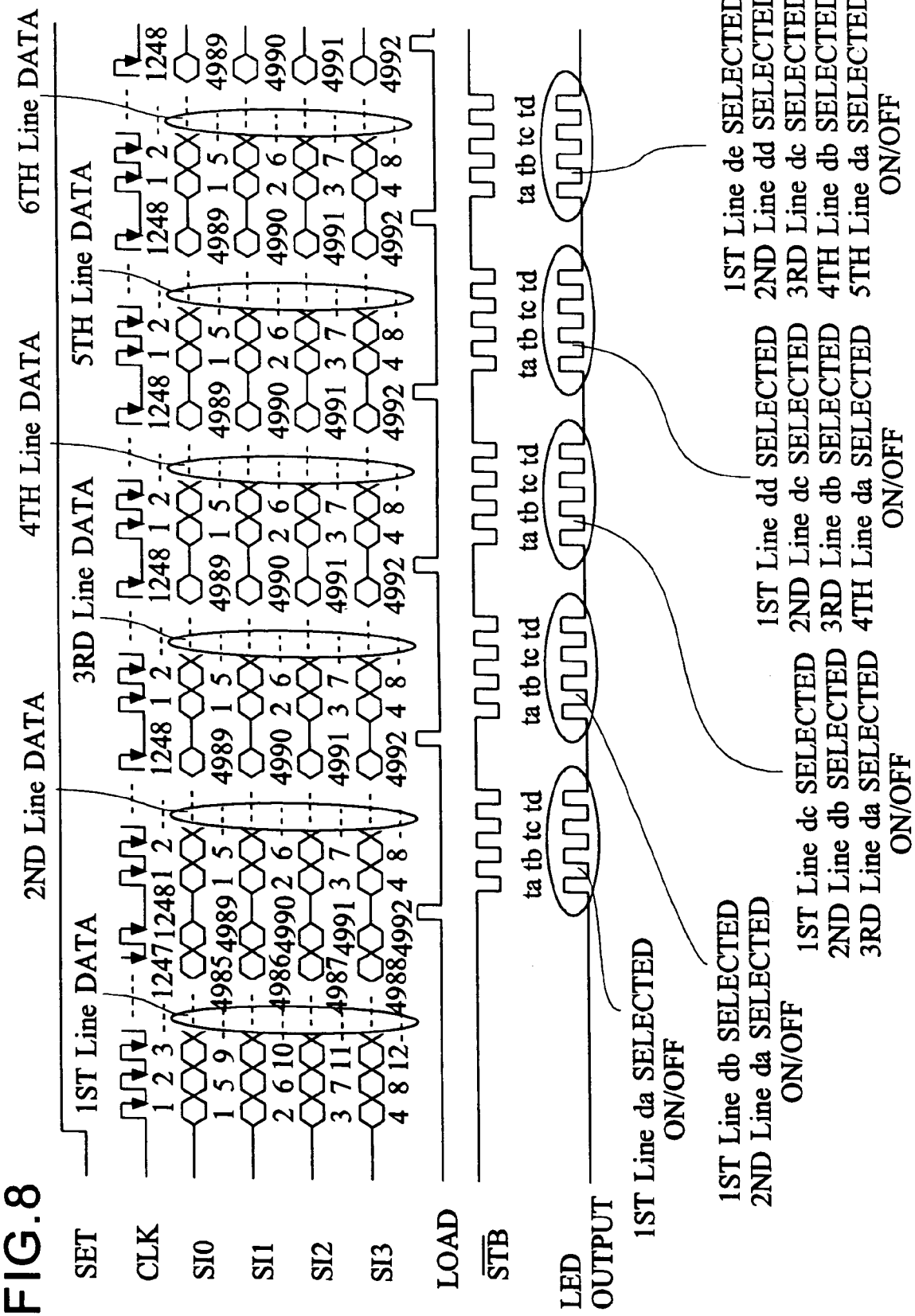

DRIVING IC AND OPTICAL PRINT HEAD

TECHNICAL FIELD

The present invention relates to an optical print head for use as a recording head in a printer or the like and to a driving IC for driving a light-emitting device provided in such an optical print head. More particularly, the present invention relates to an optical print head for use in a printer that achieves color printing by the use of a tandem-type print engine and to a driving IC for driving a light-emitting device provided in such an optical print head.

BACKGROUND ART

In a conventionally used optical print head, as shown in FIG. 13, there are provided a plurality of light-emitting devices and a plurality of driving ICs. The light-emitting devices are each composed of a plurality of light-emitting sections (it is to be understood that what is called a "light-emitting section" in the present specification corresponds to what is called a "light-emitting element" in the appended claims). The driving ICs each include, as shown in FIG. 14, a shift register 101 that takes in data signals, a latch circuit 102 that parallel takes in the data signals taken in by the shifter register 101, a drive circuit 103 that drives the light emitting device, a current supply circuit 104 that supplies electric current to the drive circuit 103, and a timing control circuit 105 that supplies predetermined timing signals to various portions of the driving IC. Now, the conventional optical print head will be described assuming that, as shown in FIG. 13, it includes 26 driving ICs "b1" to "b26" that are connected in series and 4,992 light-emitting sections #1 to #4992 that are driven by those 26 driving ICs "b1" to "b26".

In the optical print head configured as described above, first, the driving IC "b" takes in four-bit data signals fed thereto via data input terminals SI0 to SI3 and moves them to the shift register 101 in synchronism with a clock pulse CLK. The shift register 101 then outputs the thus received four-bit data signals via data output terminals SO0 to SO3 to the data input terminals SI0 to SI3 of the next driving IC in synchronism with a clock pulse CLK.

Simultaneously, the clock pulse fed in via a clock input terminal CI is fed out through a buffer via a clock output terminal CO so as to be fed to the clock input terminal CI of the next driving IC. Thus, as shown in FIG. 15, when the 1,248th clock pulse CLK is fed in, the shift registers 101 of the 26 driving ICs "b1" to "b26" take in 4,992 data signals, each taking in 4×48 (192) data signals.

When 4,992 data signals have been taken in in this way, next, a load signal LOAD is fed to a load signal input terminal LI of the driving IC. When a timing signal produced from this load signal LOAD is fed to the latch circuit 102, which is of the 192-bit type, the 192 data signals taken in by the shift register 101 are stored therein.

Simultaneously, the load signal LOAD fed in via the load signal input terminal LI is fed out through a buffer via a load signal output terminal LO so as to be fed to the load signal input terminal LI of the next driving IC. Thus, when, as shown in FIG. 15, the load signal LOAD is fed in, the data signals taken in by the shift registers 101 of the 26 driving ICs "b1" to "b26" are stored in the respective latch circuits 102.

On the basis of 4,992 data signals stored in this way in the latch circuits 102 of the driving ICs "b1" to "b26," with 192 data signals stored in the latch circuit 102 of each driving IC, the drive circuit 103 supplies electric current to terminals DO1 to DO192 during the period in which a strobe signal STB is low and thereby drives the light-emitting sections #1 to #4992 to achieve printing of one line. While the drive circuit 103 is operating in this way, the load signal LOAD is turned low, and a clock pulse CLK is fed in again to take in the data signals of the next line.

The optical print head also has, as shown in a top view thereof in FIG. 1, an SLA (self-focusing lens array) 2 for covering the light-emitting device array 1 composed of a plurality of light-emitting sections and arranged in the middle, a lens holder 3 for keeping the SLA 2 in a fixed position, and positioning pins 4a and 4b for positioning the plurality of light-emitting sections constituting the light-emitting devices arranged in the light-emitting device array 1. The light-emitting sections constituting the light-emitting device array 1 are so positioned as to be located on the straight line connecting between the positioning pins 4a and 4b.

Conventionally, an optical print head like that described above is incorporated in a printer or the like to achieve printing on paper. Here, a bend in the LED array in which light-emitting devices mounted on a circuit board are arranged, or a bend in the optical axes of the lenses provided in the optical print head, or a bend in those lenses themselves results in a bend in the imaging positions. Suppose now that light-emitting devices are arranged in a direction called the X direction and the direction perpendicular thereto is called the Y direction. Then, a bend as described above occurs in the Y direction. Hereinafter, such a bend in the Y direction is called as a "Y bend."

A Y bend is observed, for example, as deviations of the imaging positions of light-emitting sections in the Y direction as shown in graphs in FIGS. 16 and 17. Such deviations of the imaging positions occur also a result of the line connecting between the positioning pins 4a and 4b deviating obliquely in the Y direction.

A Y bend greatly degrades print quality in a tandem-type printer or the like that is provided with a plurality of optical print heads to achieve color printing. Moreover, to alleviate such lowering of print quality, it is necessary to sort out acceptable optical print heads from unusable ones, adjust lenses or sort out acceptable ones from unusable ones, or otherwise perform extra operation. This increases the costs of optical print heads and printers provided with such optical print heads.

DISCLOSURE OF THE INVENTION

An object of the present invention is to provide a driving IC that corrects deviations in imaging positions resulting from a mechanical or optical bend in an optical print head, and to provide an optical print head provided with such a driving IC.

To achieve the above object, according to one aspect of the present invention, a driving IC for driving elements is provided with: a drive circuit that produces drive signals for driving n elements based on n data signals constituting a group of data signals; x-stage latch circuits that each store one of x groups of data signals; a strobe control circuit that produces y strobe signals for determining the timing with which data signals corresponding to the individual elements are fed to the drive circuit; and a select circuit that selects the data signals corresponding to the individual elements from the x-stage latch circuits to produce one group of data signals from n data signals, and that feeds the individual data signals constituting that one group of data signals to the drive circuit in synchronism with they strobe signals fed from the strobe control circuit.

According to another aspect of the present invention, an optical print head is provided with: a light-emitting device having n light-emitting sections; a control circuit including x-stage latch circuits that each store one of x groups of data signals, each group consisting of n data signals, a select circuit that selects data signals corresponding to the light-emitting sections from the x-stage latch circuits and that forms one group of data signals from the thus selected n data signals, and a shift register that temporarily stores the data signals selected by the select circuit and that sequentially feeds out those data signals; and a driving IC having a drive circuit that produces drive signals for driving the n light-emitting sections based on the n data signals constituting that one group of data signals fed from the control circuit.

According to another aspect of the present invention, an optical print head is provided with: a light-emitting device having n light-emitting sections; and a driving IC including a drive circuit that produces drive signals for driving the n light-emitting sections based on n data signals constituting a group of data signals, a strobe control circuit that produces y strobe signals recurring every period allotted to a print line for determining the timing with which data signals corresponding to the individual light-emitting sections are fed to the drive circuit, and a select circuit that feeds the individual data signals constituting that one group of data signals to the drive circuit in synchronism with they strobe signals fed from the strobe control circuit.

According to another aspect of the present invention, an optical print head is provided with: a light-emitting device having n light-emitting sections; and a driving IC including a drive circuit that produces drive signals for driving the n light-emitting devices based on n data signals constituting a group of data signals, x-stage latch circuits that each store one of x groups of data signals, a strobe control circuit that produces y strobe signals for determining the timing with which data signals corresponding to the individual light-emitting devices are fed to the drive circuit, and a select circuit that selects the data signals corresponding to the individual light-emitting devices from the x-stage latch circuits to produce one group of data signals from n data signals, and that feeds the individual data signals constituting that one group of data signals to the drive circuit in synchronism with they strobe signals fed from the strobe control circuit.

According to another aspect of the present invention, an optical print head is provided with: a light-emitting device having n light-emitting sections; a control circuit including x-stage latch circuits that each store one of x groups of data signals, each group consisting of n data signals, a first select circuit that selects data signals corresponding to the light-emitting sections from the x-stage latch circuits and that forms one group of data signals from the thus selected n data signals, and a first shift register that temporarily stores the data signals selected by the first select circuit and that sequentially feeds out those data signals; and a driving IC including a drive circuit that produces drive signals for driving the n light-emitting sections based on n data signals constituting a group of data signals, a strobe control circuit that produces y strobe signals for determining the timing with which the data signals corresponding to the individual light-emitting sections are fed to the drive circuit, and a second select circuit that feeds the data signals corresponding to the individual light-emitting sections fed from the control circuit to the drive circuit in synchronism with the y strobe signals fed from the strobe control circuit.

BRIEF DESCRIPTION OF DRAWINGS

FIGS. 7A to 7E are diagrams showing the relationship between the imaging positions of the light-emitting sections and the image printed with corrected Y positions.

FIG. 8 is a timing chart showing the operation of the driving IC shown in FIG. 4.

BEST MODE FOR CARRYING OUT THE INVENTION

Figure 1:
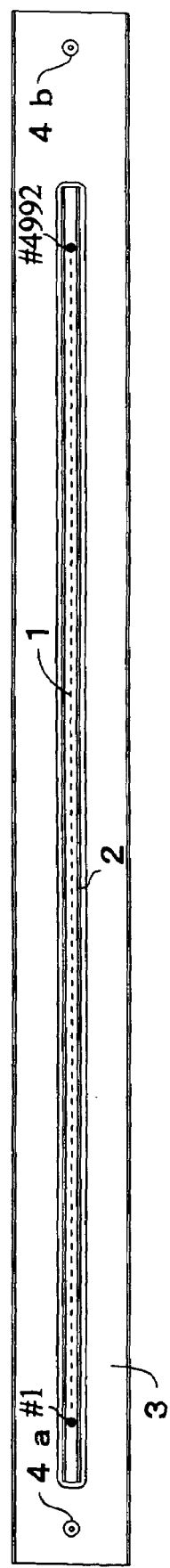
FIG. 1 is an external top view of an optical print head.
Figure 2:
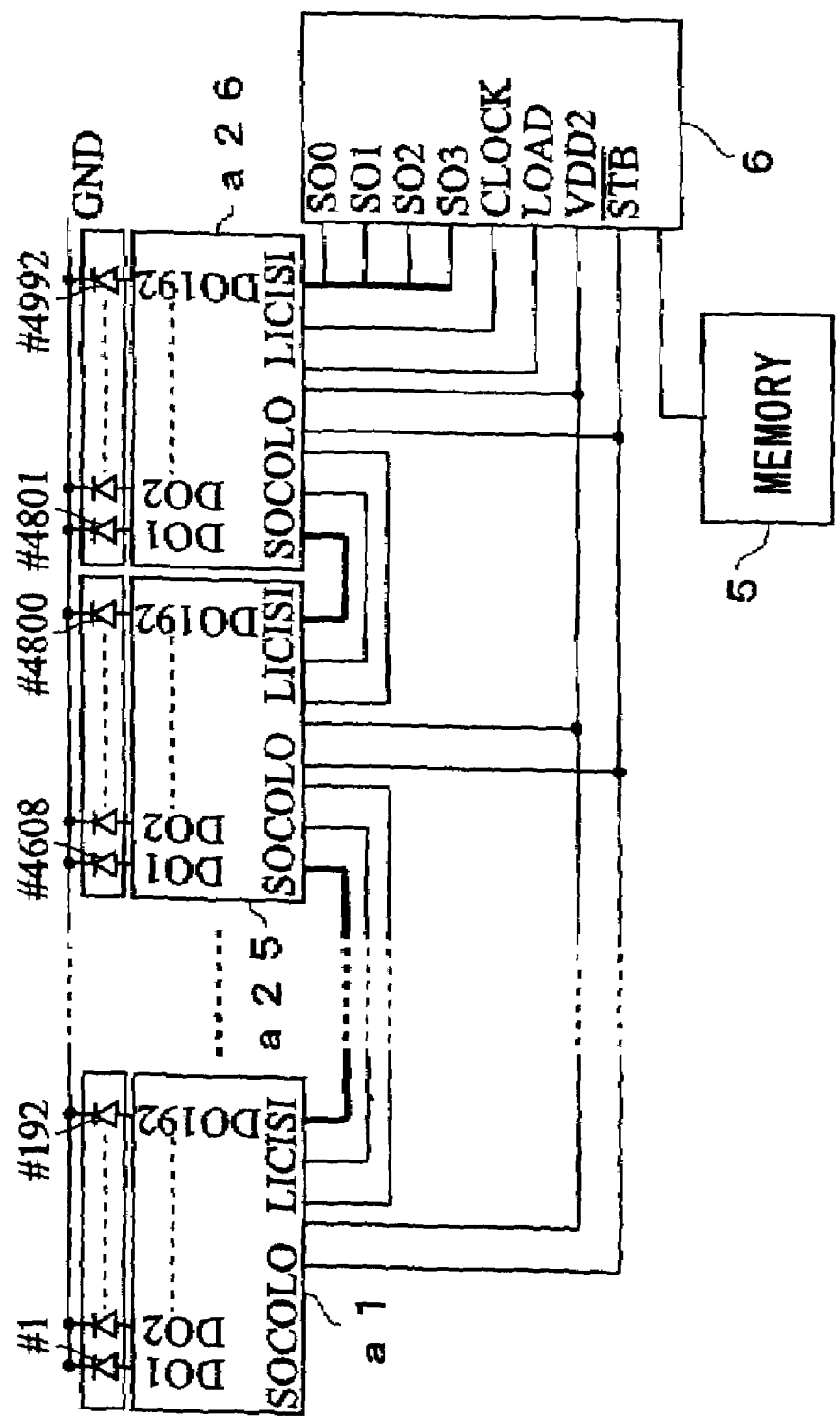
FIG. 2 is a block diagram showing the internal configuration of an optical print head embodying the invention.

Hereinafter, embodiments of the present invention will be described with reference to the drawings. The structure and configuration shown in FIGS. 1 and 2 are common to all the embodiments described hereinafter. An optical print head embodying the invention includes a light-emitting portion 1, an SLA 2, a lens holder 3, and positioning pins 4a and 4b as shown in FIG. 1, and has an internal configuration as shown in a block diagram in FIG. 2.

As shown in FIG. 2, in the optical print head embodying the invention, the light-emitting device array 1 is composed of 4,992 light-emitting sections #1 to #4992, and there are provided 26 driving ICs "a1" to "a26" for driving the light-emitting sections #1 to #4992, with each driving IC driving 192 light-emitting sections. There is also provided a memory 5, such as a flash memory, for storing data relating to the deviations of the positions of the light-emitting sections #1 to #4992 in the Y direction. There may additionally be provided a control circuit 6 for writing and reading data to and from the memory 5 and for feeding data to the driving ICs "a1" to "a26" to control their operation.

The embodiments described below all take up, as a mere example, a case where there are provided 26 driving ICs and 4,992 light-emitting sections.

Figure 3:
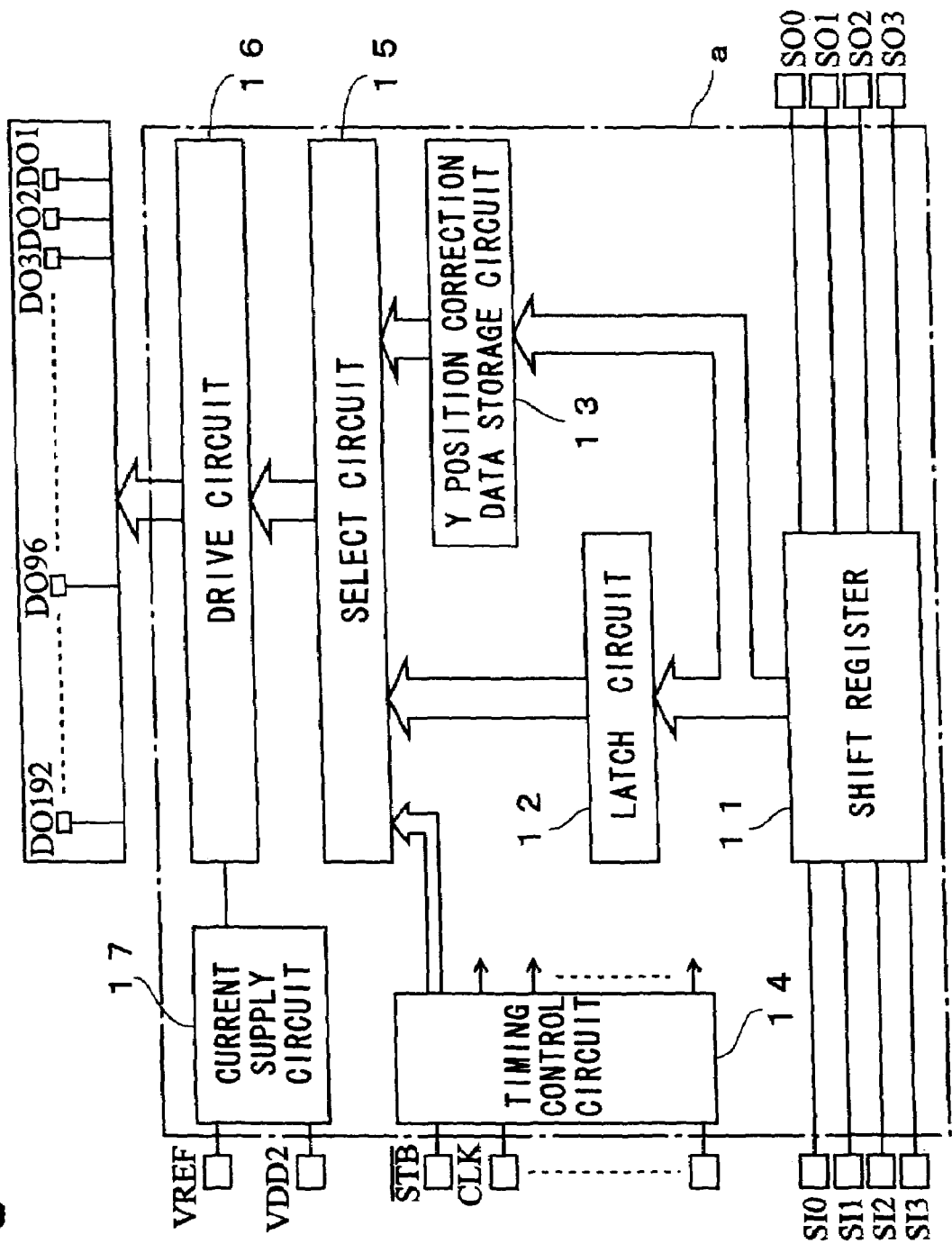
FIG. 3 is a block diagram showing the internal configuration of the driving IC provided in an optical print head embodying the invention.

In this optical print head, the driving IC "a" (i.e., each of the driving ICs "a1" to "a26" shown in FIG. 2) includes, as shown in FIG. 3, a 192-bit shift register 11 that takes in 4-bit data signals fed in a via data input terminals S10 to S13, a latch circuit 12 that takes in parallel in units of 192 bits, the data signals taken in by the shifter register 11, and a Y position correction data storage circuit 13 that stores 192 sets of correction data for correcting Y positions.

The driving IC "a" further includes a timing control circuit 14 that feeds predetermined timing signals to various portions thereof, a select circuit 15 that selects from among the data signals stored in the latch circuit 12 according to the correction data stored in the Y position correction data storage circuit 13, a drive circuit 16 that feeds out drive signals via output terminals DO1 to DO192 according to the data signals selected by the select circuit 15, and a current supply circuit 17 that feeds a constant current to the drive circuit 16.

The configuration and operation of the optical print head structured and configured as described above will be described in more detail below in the form of embodiments.

<First Embodiment>

Figure 4:
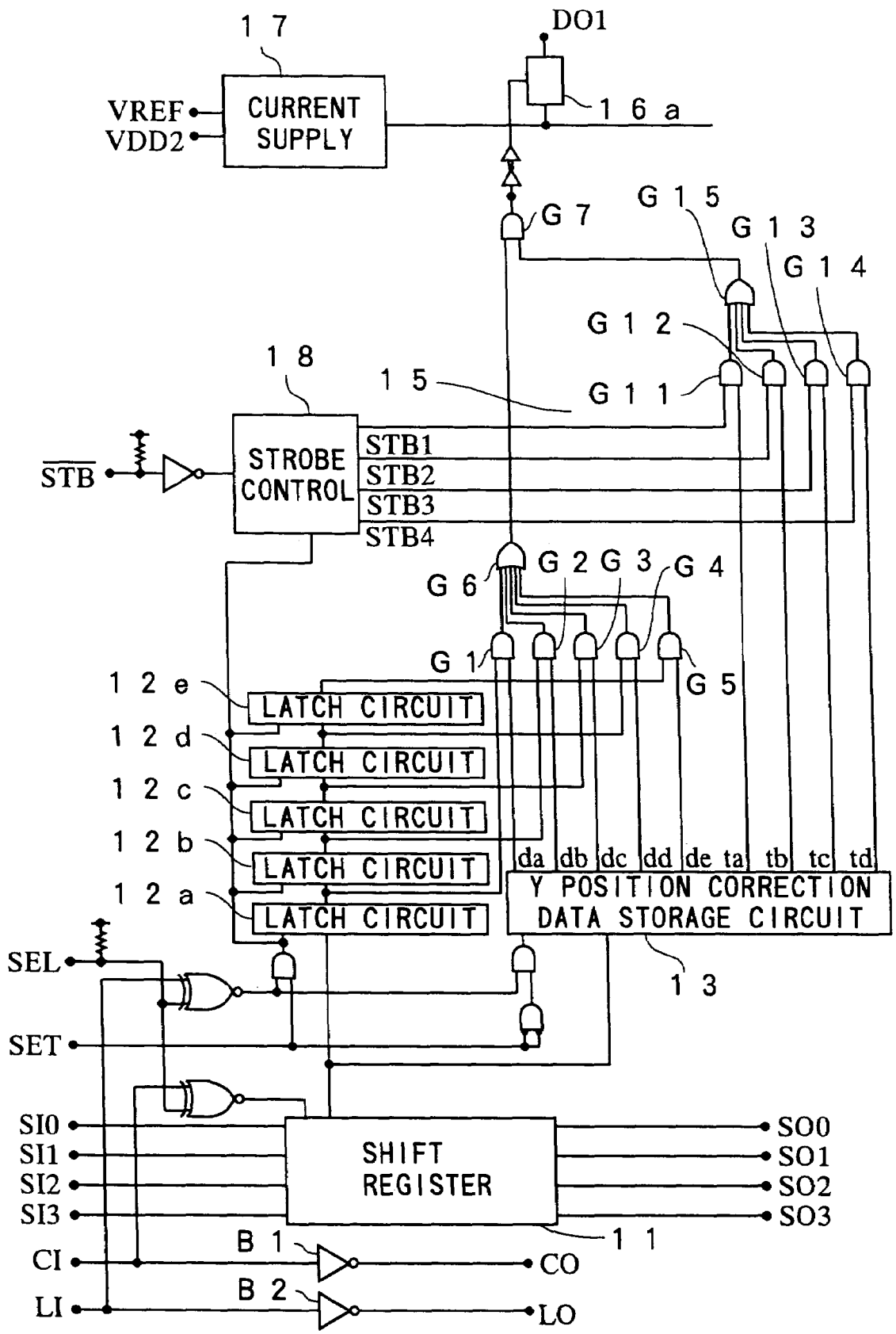
FIG. 4 is a block circuit diagram showing the internal configuration of the driving IC provided in the optical print head of a first embodiment of the invention.

Now, a first embodiment of the invention will be described with reference to the drawings. FIG. 4 is a block diagram showing the internal configuration of the driving IC provided in the optical print head of this embodiment.

In this embodiment, assuming that the driving IC "a" is configured as shown in FIG. 3 as described above, the latch circuit 12 is composed of five stages of 192-bit latch circuits connected in series. The latch circuit constituting each stage of the latch circuit 12 parallel receives 192-bit data signals output from the shift register 11 or from the latch circuit of the previous stage. The latch circuit constituting each stage of the latch circuit 12 outputs 192-bit data signals, which are fed to the select circuit 15.

The select circuit 15 selects 192-bit data signals from among the 192×5-bit data signals fed from the latch circuit 12 according to 192×5-bit correction data among 192×9-bit correction data fed from the Y position correction data storage circuit, and then feeds the thus selected 192-bit data signals to the drive circuit 16 in synchronism with whichever of internal strobe signals STB1 to STB4 fed from the timing control circuit 14 is selected according to the remaining 192×4-bit correction data.

The Y position correction data storage circuit 13 is configured, for example, as a 192×0-bit latch circuit so as to be capable of storing 192 sets of correction data corresponding to the data signals, with each set of correction data consisting of 9 bits. The correction data is written to the Y position correction data storage circuit 13 in advance on the basis of signals fed parallel in units of 192 bits from the shift register 11.

Specifically, the correction data stored in the memory 5 is read out by the control circuit of a printer itself or by the control circuit 6 provided within the print head, and is fed to the driving IC "a," where, with the Y position correction data storage circuit 13 alone kept in a writable state, for each data signal, one bit after another of the correction data is stored therein by repeating write operation nine times. In this way, the correction data is written to the Y position correction data storage circuit 13.

Now, with reference to FIG. 4, the configuration of the driving IC "a" configured as described above will be described in more detail. It is to be noted that, for simplicity's sake, FIG. 4 gives only a circuit block diagram of the portion of the driving IC "a" related to the output terminal DO1. The portions related to the other output terminals DO2 to DO192 are configured in similar manners, and therefore their explanations will be omitted.

The latch circuit 12 is composed of latch circuits 12a to 12e each capable of storing 192-bit data signals. In synchronism with a load signal LOAD, the 192-bit data signals stored in the shift register 11 are fed to the latch circuit 12a, the 192-bit data signals stored in the latch circuit 12a are fed to the latch circuit 12b, the 192-bit data signals stored in the latch circuit 12b are fed to the latch circuit 12c, the 192-bit data signals stored in the latch circuit 12c are fed to the latch circuit 12d, and the 192-bit data signals stored in the latch circuit 12d are fed to the latch circuit 12e.

Moreover, in synchronism with the load signal LOAD, the 192×5-bit data signals stored in all of these latch circuits 12a to 12e are fed simultaneously to the select circuit 15. The select circuit 15 thus receives 192×5-bit data signals, and selects therefrom 192-bit data signals to feed them to the output terminals DO1 to DO192 respectively. To achieve this, the select circuit 15 includes 192 gate circuits each composed of five AND gates G1 to G5 and one OR gate G6 and 192 gate circuits each composed of four AND gates G11 to G14 and one OR gate G15.

The select circuit 15 feeds the selected data signals to the drive circuit 16 in synchronism with one, at a time, of the internal strobe signals STB 1 to STB4 generated by a strobe control circuit 18. To achieve this, the select circuit 15 includes 192 AND gates G7 to which the outputs of the corresponding OR gates G6 and G15 are fed respectively. The drive circuit 16 is composed of 192 current amplifiers 16a that amplify the current supplied from the current supply circuit 17 and feed it to the output terminals DO1 to DO192 respectively.

Figure 5:
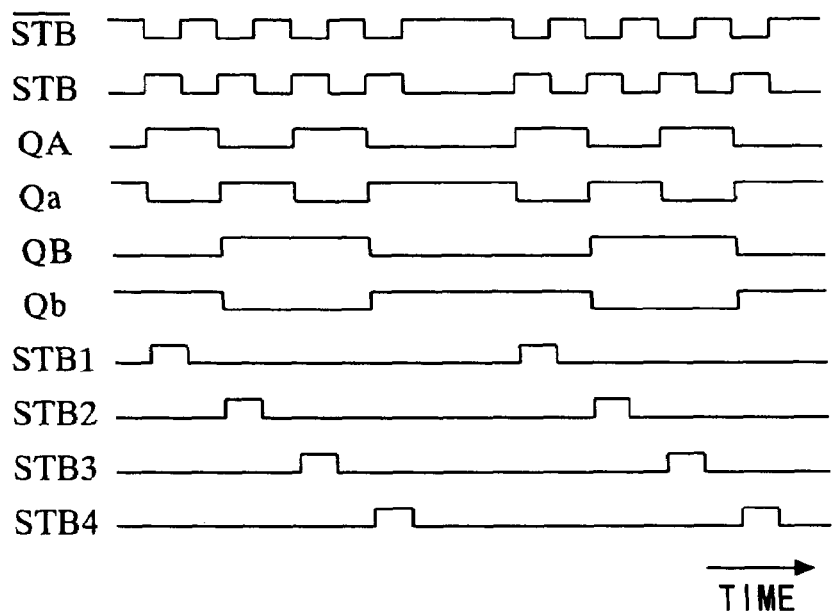
FIG. 5 is a timing chart showing the operation of the strobe control circuit.
Figure 6:
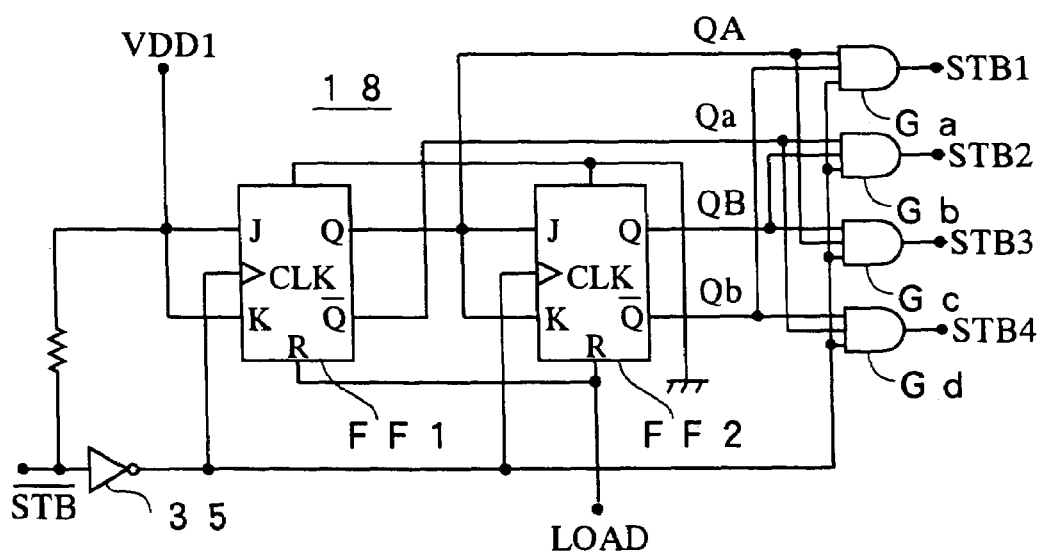
FIG. 6 is a block circuit diagram showing the internal configuration of the strobe control circuit.

The strobe control circuit 18 is, as shown in FIG. 5, which shows the waveforms of the signals relevant thereto, a circuit for generating strobe signals STB1 to STB4 for dividing the period defined by an external strobe signal (STB inverted) into a plurality of periods. The strobe control circuit 18 is configured, for example as shown in FIG. 6, as a counter composed of two flip-flops FF1 and FF2 and a plurality of (four) logic gate circuits Ga to Gd.

Specifically, the JK flip-flop FF1 receives at its input terminals J and K a supply voltage VDD1, which is always high, and receives at its clock input terminal CLK the external strobe signal (STB inverted) as inverted by an inverter 35. The flip-flop FF1 outputs at its output terminal Q a signal QA, and outputs at its output terminal (Q inverted) a signal Qa. The JK flip-flop FF2 receives at its input terminals J and K the signal QA, and receives at its clock input terminal CLK the strobe signal STB. The flip-flop FF2 outputs at its output terminal Q a signal QB, and outputs at its output terminal (Q inverted) a signal Qb.

The logic gate circuit Ga calculates the AND of the signal QA, signal Qb, and strobe signal STB, and outputs the result as the internal strobe signal STB1. The logic gate circuit Gb calculates the AND of the signal Qa, signal QB, and strobe signal STB, and outputs the result as the internal strobe signal STB2. The logic gate circuit Gc calculates the AND of the signal QA, signal QB, and strobe signal STB, and outputs the result as the internal strobe signal STB3. The logic gate circuit Gd calculates the AND of the signal Qa, signal Qb, and strobe signal STB, and outputs the result as the internal strobe signal STB4. The flip-flops FF1 and FF2 receive at their reset input terminals R the load signal LOAD as a reset signal.

In this way, the strobe control circuit 18 generates four internal strobe signals STB1 to STB4 from one external strobe signal (STB inverted). That is, a control signal (the external strobe signal) is fed in by the use of fewer signal lines than there are internal strobe signals. This makes it possible to reduce the number of terminals for receiving external control signals and thereby miniaturize the IC. It is also possible to reduce the number of conductors, such as wire-bonded wires, for external connection.

Now, the operations performed with respect to the output terminal DO1 will be described. Five bits of correction data "da" to "de" output from the Y position correction data storage circuit 13 are fed to the five AND gates G1 to G5 respectively. These AND gates G1 to G5 also receive, one bit each, the data signals that are fed from the latch circuits 12a to 12e so as to be fed to the output terminal DO1. The outputs of the AND gates G1 to G5 are fed to the OR gate G6. Thus, the OR gate G6 outputs the output of that AND gate which receives whichever of the correction data bits "da" to "de" is high.

Moreover, four bits of correction data "ta" to "td" output from the Y position correction data storage circuit 13 are fed to the four AND gates G11 to G14. These AND gates G11 to G14 also receive respectively the internal strobe signals STB1 to STB4 generated by the strobe control circuit 18. The outputs of the AND gates G11 to G14 are fed to the OR gate G15. Thus, the OR gate G15 outputs the output of that AND gate which receives whichever of the correction data bits "ta" to "td" is high. The outputs of the OR gates G6 and G15 are fed to the AND gate G7. Thus, the data signals selected according to the correction data "da" to "de" are fed through the AND gate G7 to the current amplifier 16a in synchronism with whichever of the internal strobe signals STB1 to STB4 is selected according to the correction data "ta" to "td."

The data signals output from the shift register 11 are fed out in units of four bits via the data output terminals SO0 to SO3 so as to be fed to the data input terminals SI0 to SI3 of the next driving IC "a." The clock CLK fed in via the clock input terminal CI is fed out through a buffer B1 via the clock output terminal CO so as to be fed to the clock input terminal CI of the next driving IC "a." The load signal LOAD fed in via the load signal input terminal LI is fed out through a buffer B2 via the load signal output terminal LO so as to be fed to the load signal input terminal LI of the next driving IC "a."

Now, the operation of the optical print head incorporating the driving ICs "a1" to "a26" each configured as described above will be described with reference to FIGS. 7A to 7E and 8. FIGS. 7A to 7E are diagrams showing the imaging positions of the light-emitting sections in the Y direction and the image printed with corrected Y positions. FIG. 8 is a timing chart showing the operation of the driving ICs.

First, a brief description will be given with reference to FIGS. 7A to 7E. It is to be noted that, in FIGS. 7A to 7E, for simplicity's sake, it is assumed that there are 17 dots, i.e., 17 light-emitting sections. Moreover, it is also assumed that paper is fed in the direction indicated by arrows in FIGS. 7A to 7E (i.e., in the direction opposite to the printing direction).

First, the imaging positions of the individual light-emitting sections #1 to #17 are checked by measuring them with a CCD (charge-coupled device), or by measuring the curvature of a printed straight line, or by another method. On the basis of the imaging positions of the light-emitting sections #1 to #17 thus found, for each of the light-emitting sections #1 to #17, he correction data bits "da" to "de" and "ta" to "td" are so set as to represent the appropriate timing with which to light that light-emitting section. The correction data bits "da" to "de" and "ta" to "td" thus set are then written to the memory 5 by the control circuit 6.

For example, consider a case where the imaging positions of the light-emitting sections #1 to #17 are found to be located as shown in FIG. 7A and, among the light-emitting sections #1 to #17, the one with the lowest imaging position, namely the light-emitting section #17, is used as the reference position. In this case, as shown in FIG. 7B, for the light-emitting sections #15 to #17, the correction data bit "da" is set; for the light-emitting sections #1, #2, #13, and #14, the correction data bit "db" is set; for the light-emitting sections #3, ##11, and #12, the correction data bit "dc" is set; for the light-emitting sections #5 to #7, 9 and #10, the correction data bit "dd" is set; and for the light-emitting section #8, the correction data bit "de" is set. The correction data bits "da" to "de" thus set are then stored in the memory 5.

These correction data bits "da" to "de" are set in the following manner. The correction data bit "da" is set for those light-emitting sections of which the imaging position is close to the reference position. The correction data bit "db" is set for those light-emitting sections of which the imaging position is deviated roughly one line from the reference position in the paper feed direction. The correction data bit "dc" is set for those light emitting sections of which the imaging position is deviated roughly two lines from the reference position in the paper feed direction. The correction data bit "dd" is set for those light-emitting sections of which the imaging position is deviated roughly three lines from the reference position in the paper feed direction. The correction data bit "de" is set for those light-emitting sections of which the imaging position is deviated roughly fourth lines from the reference position in the paper feed direction.

With Y positions corrected according to the correction data bits "da" to "de," which are used to achieve Y position correction among different lines, the imaging positions of the light-emitting sections #1 to #17, which are found to be located as shown in FIG. 7A, are corrected as shown in FIG. 7C. However, as FIG. 7C clearly shows, even with Y positions corrected among different lines, the deviations of the imaging positions of the light-emitting sections from the reference position are not completely eliminated. To minimize the remaining deviations, the interval between the reference position and the position deviated one line therefrom in the paper feed direction is divided into four regions, and, for each of the light-emitting sections #1 to #17, the correction data bits "ta" to "td" are also set to correct their Y positions for deviations among those four regions. Here, the interval between two adjacent lines is assumed to be L.

Specifically, as shown in FIG. 7D, for the light-emitting sections #1, #3, #5, #8, #10, #12, #14, and #17, the correction data bit "ta" is set; for the light-emitting sections #6 and #16, the correction data bit "tb" is set; for the light-emitting sections #2, #4, #9, #11, and #13, the correction data bit "tc" is set; and for the light-emitting sections #7 and #15, the correction data bit "td" is set. The correction data bits "ta" to "td" thus set are then stored in the memory 5.

These correction data bits "ta" to "td" are set in the following manner. The correction data bit "ta" is set for those light-emitting sections of which the imaging position is close to the reference position. The correction data bit "tb" is set for those light-emitting sections of which the imaging position is deviated roughly (¼)L from the reference position in the paper feed direction. The correction data bit "tc" is set for those light-emitting sections of which the imaging position is deviated roughly (½)L from the reference position in the paper feed direction. The correction data bit "td" is set for those light-emitting sections of which the imaging position is deviated roughly (¾)L from the reference position in the paper feed direction.

For example, at start-up, the correction data bits "da" to "de" and "ta" to "td" for the individual light-emitting sections #1 to #17 that are stored in the memory 5 are read out by the control circuit of a printer itself or by the control circuit 6 provided within the print head, and are fed to the driving IC "a" so as to be stored, through the shift register 11, in the Y position correction data storage circuit 13.

Then, first, the data signals stored in the latch circuit 12a are fed only through the AND gates G1 to which the correction data bit "da" is fed, i.e., those which correspond to the output terminals DO15 to DO17, and then through the corresponding OR gates G6 to the corresponding AND gates G7. In this state, when the strobe control circuit 18 outputs the internal strobe signal STB1, the output of only the AND gate G11 to which the correction data bit "ta" is fed, i.e., that which corresponds to the output terminal DO17, turns high, and the output of this AND gate G11 is fed through the corresponding OR gate G15 to the corresponding AND gate G7. Thus, the data signals stored in the latch circuit 12a are fed only to the current amplifier 16a corresponding to the output terminal DO17, and electric current is fed to the light-emitting section #17, which thus performs printing close to the reference position.

When the strobe control circuit 18 outputs the internal strobe signal STB2, the output of only the AND gate G12 to which the correction data bit "tb" is fed, i.e., that which corresponds to the output terminal DO16, turns high, and the output of this AND gate G12 is fed through the corresponding OR gate G15 to the corresponding AND gate G7. Thus, the data signals stored in the latch circuit 12a are fed only to the current amplifier 16a corresponding to the output terminal DO16, and electric current is fed to the light-emitting section #16, which thus performs printing in the position deviated (¼)L from the reference position.

When the strobe control circuit 18, after outputting the internal strobe signal STB3, outputs the internal strobe signal STB4, the output of only the AND gate G14 to which the correction data bit "td" is fed, i.e., that which corresponds to the output terminal DO15, turns high, and the output of this AND gate G14 is fed through the corresponding OR gate G15 to the corresponding AND gate G7. Thus, the data signals stored in the latch circuit 12a are fed only to the current amplifier 16a corresponding to the output terminal DO15, and electric current is fed to the light-emitting section #15, which thus performs printing in the position deviated (¾)L from the reference position. When the printing of this line is complete, the data signals stored in the latch circuit 12a are moved to the latch circuit 12b.

Next, printing in the position deviated one line from the reference position is performed in the following manner. The data signals stored in the latch circuit 12b are fed only through the AND gates G2 to which the correction data bit "db" is fed, i.e., those which correspond to the output terminals DO1, DO2, DO13, and DO14, and then through the corresponding OR gates G6 to the corresponding AND gates G7. In this state, when the strobe control circuit 18 outputs the internal strobe signal STB1, the outputs of only the AND gates G11 to which the correction data bit "ta" is fed, i.e., those which correspond to the output terminals DO1 and DO14, turn high, and the outputs of these AND gates G11 are fed through the corresponding OR gates G15 to the corresponding AND gates G7. Thus, the data signals stored in the latch circuit 12b are fed only to the current amplifiers 16a corresponding to the output terminals DO1 and DO14, and electric current is fed to the light-emitting sections #1 and #14, which thus perform printing in the position deviated one line from the reference position.

When the strobe control circuit 18, after outputting the internal strobe signal STB2, outputs the internal strobe signal STB3, the outputs of only the AND gates G13 to which the correction data bit "tc" is fed, i.e., those which correspond to the output terminal DO2 and DO13, turn high, and the outputs of these AND gates G13 are fed through the corresponding OR gates G15 to the corresponding AND gates G7. Thus, the data signals stored in the latch circuit 12b are fed only to the current amplifier 16a corresponding to the output terminals DO2 and DO13, and electric current is fed to the light-emitting sections #2 and #13, which thus perform printing in the position deviated (½)L further from the position deviated one line from the reference position.

When the strobe control circuit 18 outputs the internal strobe signal STB4, the printing of this line is complete, and the data signals stored in the latch circuit 12b are moved to the latch circuit 12c.

Next, printing in the position deviated two lines from the reference position is performed in the following manner. First, the data signals stored in the latch circuit 12c are fed only through the AND gates G3 to which the correction data bit "dc" is fed, i.e., those which correspond to the output terminals DO3, DO4, DO11, and DO12, and then through the corresponding OR gates G6 to the corresponding AND gates G7. In this state, when the strobe control circuit 18 outputs the internal strobe signal STB1, the outputs of only the AND gates G11 to which the correction data bit "ta" is fed, i.e., those which correspond to the output terminals DO3 and DO12, turn high, and the outputs of these AND gates G11 are fed through the corresponding OR gates G15 to the corresponding AND gates G7. Thus, the data signals stored in the latch circuit 12c are fed only to the current amplifiers 16a corresponding to the output terminals DO3 and DO12, and electric current is fed to the light-emitting sections #3 and #12, which thus perform printing in the position deviated two lines from to the reference position.

When the strobe control circuit 18, after outputting the internal strobe signal STB2, outputs the internal strobe signal STB3, the outputs of only the AND gates G13 to which the correction data bit "tc" is fed, i.e., those which correspond to the output terminals DO4 and DO11, turn high, and the outputs of these AND gates G13 are fed through the corresponding OR gates G15 to the corresponding AND gates G7. Thus, the data signals stored in the latch circuit 12c are fed only to the current amplifiers 16a corresponding to the output terminals DO4 and DO11, and electric current is fed to the light-emitting sections #4 and #11, which thus perform printing in the position deviated (½)L further from the position deviated two lines from the reference position.

When the strobe control circuit 18 outputs the internal strobe signal STB4, the printing of this line is complete, and the data signals stored in the latch circuit 12c are moved to the latch circuit 12d.

Next, printing in the position deviated three lines from the reference position is performed in the following manner. First, the data signals stored in the latch circuit 12d are fed only through the AND gates G4 to which the correction data bit "dd" is fed, i.e., those which correspond to the output terminals DO5 to DO7, DO9, and DO10, and then through the corresponding OR gates G6 to the corresponding AND gates G7. In this state, when the strobe control circuit 18 outputs the internal strobe signal STB1, the outputs of only the AND gates G11 to which the correction data bit "ta" is fed, i.e., those which correspond to the output terminals DO5 and DO10, turn high, and the outputs of these AND gates G11 are fed through the corresponding OR gates G15 to the corresponding AND gates G7. Thus, the data signals stored in the latch circuit 12d are fed only to the current amplifiers 16a corresponding to the output terminals DO5 and DO10, and electric current is fed to the light-emitting sections #5 and #10, which thus perform printing in the position deviated three lines from to the reference position.

When the strobe control circuit 18 outputs the internal strobe signal STB2, the output of only the AND gate G12 to which the correction data bit "tb" is fed, i.e., that which corresponds to the output terminal DO6, turns high, and the output of this AND gates G12 is fed through the corresponding OR gate G15 to the corresponding AND gate G7. Thus, the data signals stored in the latch circuit 12d are fed only to the current amplifier 16a corresponding to the output terminal DO6, and electric current is fed to the light-emitting section #6, which thus performs printing in the position deviated (¼)L further from the position deviated three lines from to the reference position.

When the strobe control circuit 18 outputs the internal strobe signal STB3, the output of only the AND gate G13 to which the correction data bit "tc" is fed, i.e., that which corresponds to the output terminal DO9, turns high, and the output of this AND gates G13 is fed through the corresponding OR gate G15 to the corresponding AND gate G7. Thus, the data signals stored in the latch circuit 12d are fed only to the current amplifier 16a corresponding to the output terminal DO9, and electric current is fed to the light-emitting section #9, which thus performs printing in the position deviated (½)L further from the position deviated three lines from to the reference position.

When the strobe control circuit 18 outputs the internal strobe signal STB4, the output of only the AND gate G14 to which the correction data bit "td" is fed, i.e., that which corresponds to the output terminal DO7, turns high, and the output of this AND gates G14 is fed through the corresponding OR gate G15 to the corresponding AND gate G7. Thus, the data signals stored in the latch circuit 12d are fed only to the current amplifier 16a corresponding to the output terminal DO7, and electric current is fed to the light-emitting section #7, which thus performs printing in the position deviated (¾)L further from the position deviated three lines from to the reference position. When the printing of this line is complete, the data signals stored in the latch circuit 12d are moved to the latch circuit 12e.

Lastly, printing in the position deviated four lines from the reference position is performed in the following manner. First, the data signals stored in the latch circuit 12e are fed only through the AND gate G5 to which the correction data bit "de" is fed, i.e., that which corresponds to the output terminal DO8, and then through the corresponding OR gate G6 to the corresponding AND gate G7. In this state, when the strobe control circuit 18 outputs the internal strobe signal STB1, the output of only the AND gate G1 to which the correction data bit "ta" is fed, i.e., that which corresponds to the output terminal DO8, turns high, and the output of this AND gate G11 is fed through the corresponding OR gate G15 to the corresponding AND gate G7. Thus, the data signals stored in the latch circuit 12e are fed only to the current amplifier 16a corresponding to the output terminal DO8, and electric current is fed to the light-emitting section #8, which thus perform printing in the position deviated four lines from to the reference position.

Thereafter, the strobe control circuit 18 outputs the internal strobe signals STB2, STB3, and STB4. Ultimately, with Y positions corrected, the printed image exhibits greatly improved linearity as shown in FIG. 7E as compared with that shown in FIG. 7C.

In this way, the light-emitting sections #15 to #17 are fed with the data of the line currently being printed, the light-emitting sections #1, #2, #13, and #14 are fed with the data of the line one line previous to the line currently being printed, the light-emitting sections #3, #4, #11, and #12 are fed with the data of the line two lines previous to the line currently being printed, the light-emitting sections #5 to #7, #9, and #10 are fed with the data of the line three lines previous to the line currently being printed, and the light-emitting section #8 is fed with the data of the line four lines previous to the line currently being printed.

In addition, the data to be fed to the individual light-emitting sections #1 to #17 is fed thereto in the following manner. The light-emitting sections #1, #3, #5, #8, #10, #12, #14, and #17 receive the data in synchronism with the internal strobe signal STB1, the light-emitting sections #6 and #16 receive the data in synchronism with the internal strobe signal STB2, the light-emitting sections #2, #4, #9, #11, and #13 receive the data in synchronism with the internal strobe signal STB3, and the light-emitting sections #7 and #15 receive the data in synchronism with the internal strobe signal STB4.

Next, the operation of this optical print head will be described in detail with reference to a timing chart shown in FIG. 8. The correction data stored in the memory 5 has previously been written to the Y position correction data storage circuit 13 in the manner described earlier. Then, first, a set signal SET turns from low to high to inhibit writing to the Y position correction data storage circuit 13.

Then, data signals corresponding to 1 line (4,992 bits) are fed, in units of four bits and one unit after the next, to the data input terminals SI0 to SI3 of the driving IC "a26" located at an end, and those data signals are taken in by the shift registers 11 of the driving ICs "a1" to "a26" in synchronism with pulses in the clock CLK. Specifically, the first, fifth, ninth, data signals are fed to the data input terminal SI0 of the driving IC "a26," the second, sixth, tenth, . . . data signals are fed to the data input terminal SI1 of the driving IC "a26," the third, seventh, eleventh, . . . data signals are fed to the data input terminal SI2 of the driving IC "a26," and the fourth, eighth, twelfth, . . . data signals are fed to the data input terminal SI3 of the driving IC "a26."

When the 1,248th clock pulse CLK is fed in, of the data signals corresponding to the first line, the 1st to 192nd data signals, the 193rd to 384th data signals, . . . , and the 4,801st to 4,992nd data signals are stored in the shift registers 11 of the driving ICs "a1," "a2," . . . , and "a26" respectively. When the data signals of the first line have been stored in the shift registers 11 of the driving ICs "a1" to "a26" in this way, the clock CLK ceases to be fed in, and a high level is fed in as the load signal LOAD.

In synchronism with the load signal LOAD, in each of the driving ICs "a1" to "a26," the data signals stored in the shift register 11 are written to the latch circuit 12a. The data signals thus written to the latch circuit 12a are fed only through the AND gates G1 to which the correction data bit "da" is fed and then through the corresponding OR gates G6 to the corresponding AND gates G7. Thus, of the data signals of the first line stored in the latch circuit 12a, only those to be fed to the light-emitting sections located in the position corresponding to the correction data bit "da" (i.e., those located close to the reference position) are fed from the latch circuit 12a to the AND gates G7.

Subsequently, the load signal LOAD is turned low, and then the clock CLK starts being fed in again at the same time that four low-level pulses are fed in as the external strobe signal (STB inverted). This causes the strobe control circuit 18 to output the internal strobe signals STB1 to STB4 in the order STB1, then STB2, then STB3, and then STB4 as described with reference to FIG. 5.

As a result, first, the internal strobe signal STB1 is fed through the AND gates G11 to which the correction data bit "ta" is fed and then through the corresponding OR gates G15 to the corresponding AND gates G7, and thus the data signals to be fed to the light-emitting sections located close to the reference position of the first line are fed to the drive circuit 16. Next, when the internal strobe signal STB2 appears, it is fed through the AND gates G12 to which the correction data bit "tb" is fed and then through the corresponding OR gates G15 to the corresponding AND gates G7. Thus, the data signals to be fed to the light-emitting sections located in the position deviated ($\frac{1}{4}$)L from the reference position of the first line are fed to the drive circuit 16.

Next, when the internal strobe signal STB3 appears, it is fed through the AND gates G13 to which the correction data bit "tc" is fed and then through the corresponding OR gates G15 to the corresponding AND gates G7. Thus, the data signals to be fed to the light-emitting sections located in the position deviated ($\frac{1}{2}$)L from the reference position of the first line are fed to the drive circuit 16. Lastly, when the internal strobe signal STB4 appears, it is fed through the AND gates G14 to which the correction data bit "td" is fed and then through the corresponding OR gates G15 to the corresponding AND gates G7. Thus, the data signals to be fed to the light-emitting sections located in the position deviated ($\frac{3}{4}$)L from the reference position of the first line are fed to the drive circuit 16. Concurrently, in synchronism with clocks in the pulse CLK, the data signals corresponding to the second line are taken in by the shift register 11 of the driving IC "a."

Thereafter, when the data signals of the second line are stored in the shift register 11 of the driving IC "a," a high level is fed in as the load signal LOAD. This causes the data signals of the first line stored in the latch circuit 12a to be written to the latch circuit 12b, and simultaneously the data signals of the second line stored in the shift register 11 to be written to the latch circuit 12a. The data signals thus written to the latch circuit 12a are fed through the AND gates G1 to which the correction data bit "da" is fed and then through the corresponding OR gates G6 to the corresponding AND gates G7. On the other hand, the data signals written to the latch circuit 12b are fed through the AND gates G2 to which the correction data bit "db" is fed and then through the corresponding OR gates G6 to the corresponding AND gates G7.

As a result, first, the internal strobe signal STB1 is fed through the AND gates G11 to which the correction data bit "ta" is fed and then through the corresponding OR gates G15 to the corresponding AND gates G7, and thus the data signals to be fed to the light-emitting sections located close to the reference position of the second line and those to be fed to the light-emitting sections located in the position deviated one line from the reference position of the first line are fed to the drive circuit 16. Next, when the internal strobe signal STB2 appears, it is fed through the AND gates G12 to which the correction data bit "tb" is fed and then through the corresponding OR gates G15 to the corresponding AND gates G7. Thus, the data signals to be fed to the light-emitting sections located in the position deviated ($\frac{1}{4}$)L from the reference position of the second line and those to be fed to the light-emitting sections located in the position deviated one line plus ($\frac{1}{4}$)L from the reference position of the first line are fed to the drive circuit 16.

Next, when the internal strobe signal STB3 appears, it is fed through the AND gates G13 to which the correction data bit "tc" is fed and then through the corresponding OR gates G15 to the corresponding AND gates G7. Thus, the data signals to be fed to the light-emitting sections located in the position deviated ($\frac{1}{2}$)L from the reference position of the second line and those to be fed to the light-emitting sections located in the position deviated one line plus ($\frac{1}{2}$)L from the reference position of the first line are fed to the drive circuit 16.

Lastly, when the internal strobe signal STB4 appears, it is fed through the AND gates G14 to which the correction data bit "td" is fed and then through the corresponding OR gates G15 to the corresponding AND gates G7. Thus, the data signals to be fed to the light-emitting sections located in the position deviated ($\frac{3}{4}$)L from the reference position of the second line and those to be fed to the light-emitting sections located in the position deviated one line plus ($\frac{3}{4}$)L from the reference position of the first line are fed to the drive circuit 16. Concurrently, in synchronism with clocks in the pulse CLK, the data signals corresponding to the third line are taken in by the shift register 11 of the driving IC "a."

Thereafter, the clock CLK, the load signal LOAD, and the external strobe signal (STB inverted) repeat behaving in the manner described above and thereby achieve the following operations. First, the data signals corresponding to the third, second, and first lines are stored in the latch circuits 12a, 12b, and 12c respectively. Then, with respect to the light-emitting sections located in positions deviated roughly two lines from the reference position of the first line, those located in position deviated roughly one line from the reference position of the second line, and those located close to the reference position of the third line, current is fed first to those located in the position of the respective line, then to those located in the position deviated ($\frac{1}{4}$)L from the respective line, then to those located in the position deviated ($\frac{1}{2}$)L from the respective line, and then to those located in the position deviated ($\frac{3}{4}$)L from the respective line.

Next, the data signals corresponding to the fourth, third, second, and first lines are stored in the latch circuits 12a, 12b, 12c, and 12d respectively. Then, with respect to the light-emitting sections located in positions deviated roughly three lines from the reference position of the first line, those located in position deviated roughly two lines from the reference position of the second line, those located in position deviated roughly one line from the reference position of the third line, and those located close to the reference position of the fourth line, current is fed first to those located in the position of the respective line, then to those located in the position deviated ($\frac{1}{4}$)L from the respective line, then to those located in the position deviated ($\frac{1}{2}$)L from the respective line, and then to those located in the position deviated ($\frac{3}{4}$)L from the respective line.

Next, the data signals corresponding to the fifth, fourth, third, second, and first lines are stored in the latch circuits 12a, 12b, 12c, 12d, and 12e respectively. Then, with respect to the light-emitting sections located in positions deviated roughly four lines from the reference position of the first line, those located in position deviated roughly three lines from the reference position of the second line, those located in position deviated roughly two lines from the reference position of the third line, those located in position deviated roughly one line from the reference position of the fourth line, and those located close to the reference position of the fifth line, current is fed first to those located in the position of the respective line, then to those located in the position deviated (¼)L from the respective line, then to those located in the position deviated (½)L from the respective line, and then to those located in the position deviated (¾)L from the respective line.

Thus, it is when the light emission for five lines is complete that the light emission for the first line is complete. Thereafter, the operations described above are repeated so that the light emission for the second, third, . . . lines are performed successively until eventually exposure is complete over one whole screen of an electrostatic printer.

As described above, in this embodiment, the driving ICs "a1" to "a26" perform Y position correction among different lines and Y position correction among different regions between adjacent lines simultaneously. That is, the driving ICs "a1" to "a26" correct Y positions for deviations as shown in FIG. 7A to directly obtain corrected Y positions as shown in FIG. 7E. In this way, it is possible to correct a Y bend with high accuracy.

<Second Embodiment>

Figure 9:
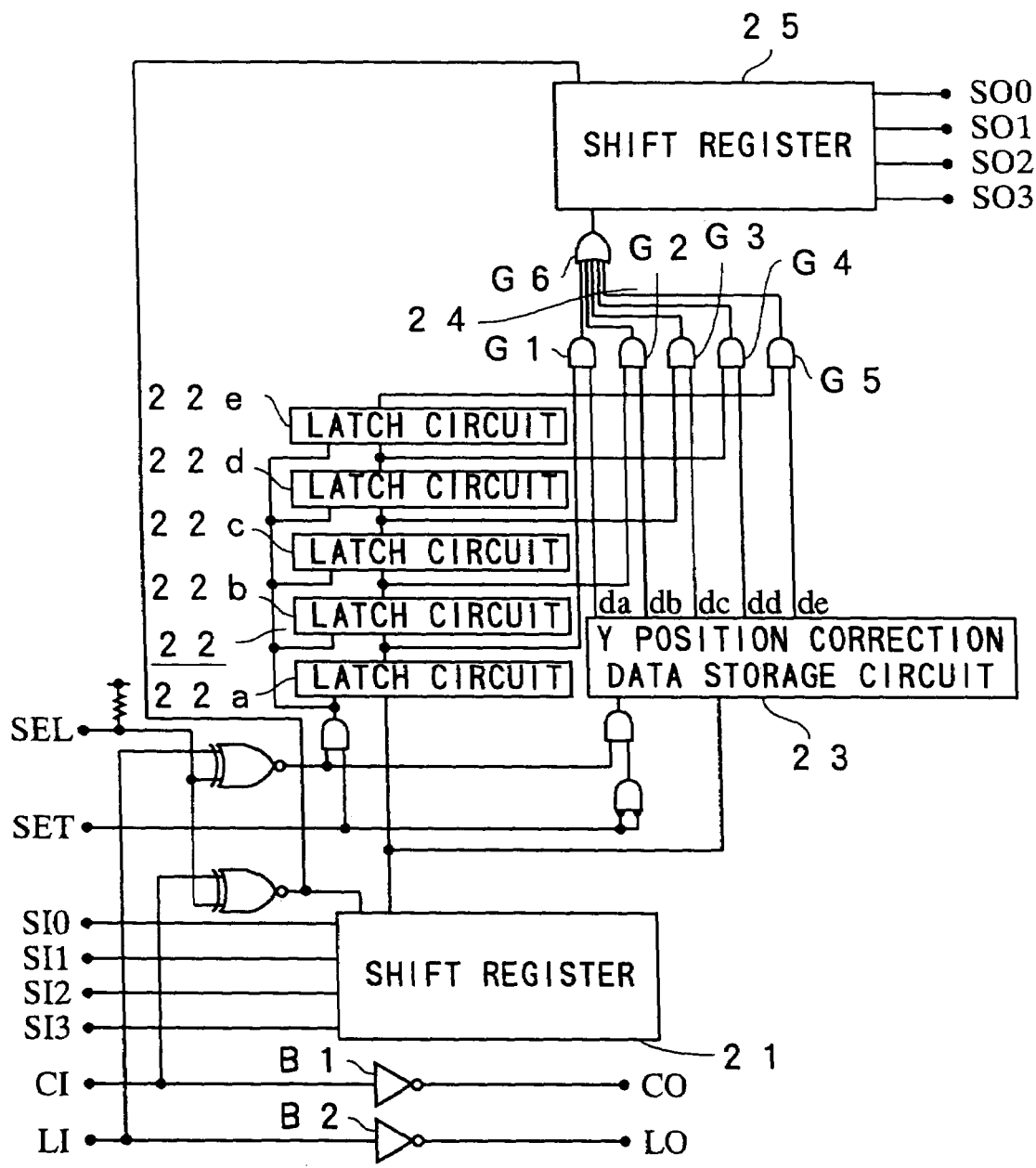
FIG. 9 is a block circuit diagram showing the configuration of a principal portion of the control circuit provided in the optical print head of a second embodiment of the invention.
Figure 10:
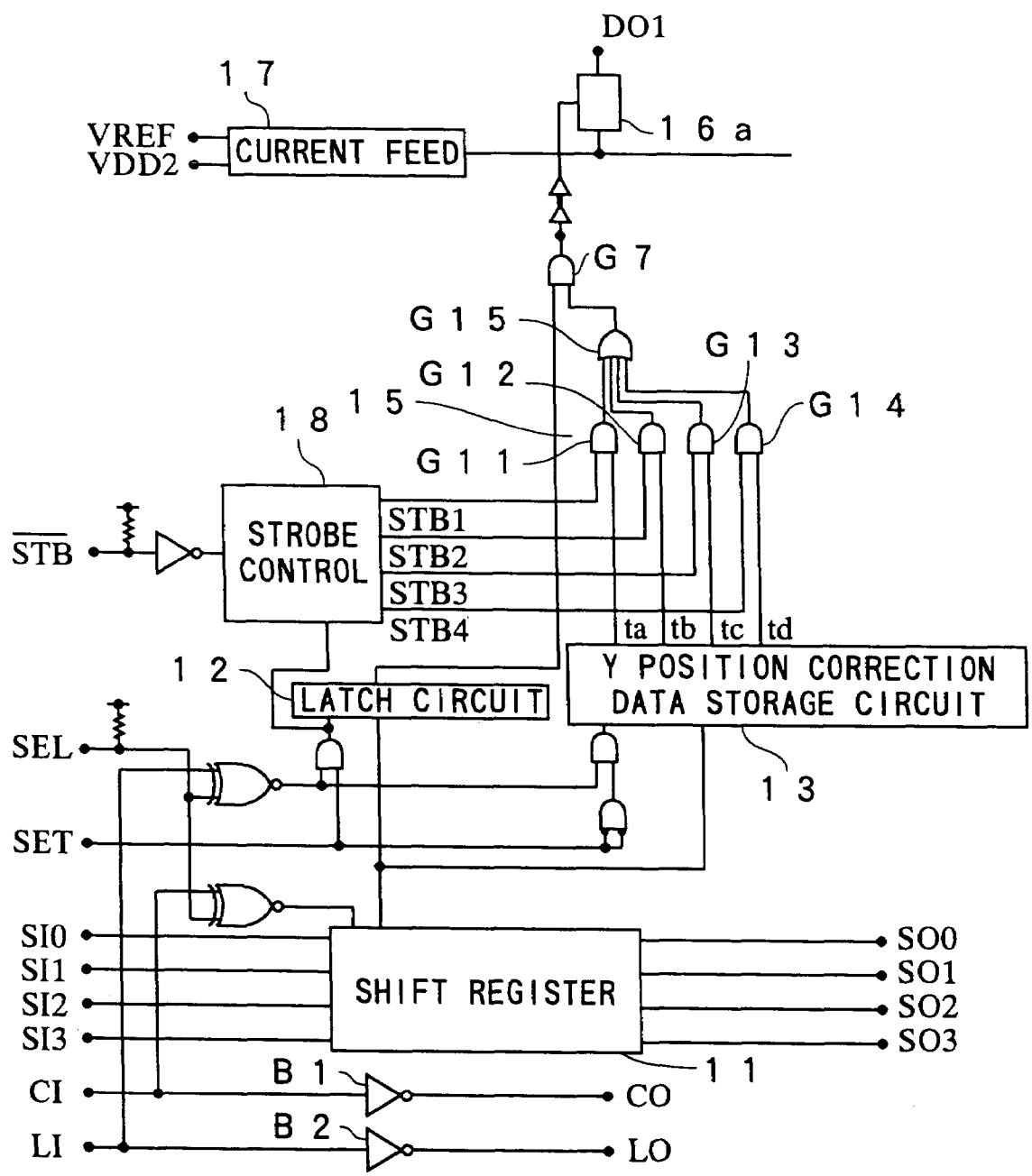
FIG. 10 is a block circuit diagram showing the internal configuration of the driving IC provided in the optical print head of the second embodiment.

Now, a second embodiment of the invention will be described with reference to the drawings. FIG. 9 is a block circuit diagram showing the configuration of a principal portion of the control circuit provided in the optical print head of this embodiment. FIG. 10 is a block circuit diagram showing the internal configuration of the driving IC provided in the optical print head of this embodiment. In FIG. 10, such circuit elements as serve the same purposes as in FIG. 4 are identified with the same reference numerals and symbols, and their detailed explanations will not be repeated.

In this embodiment, assuming that the optical print head is configured as shown in FIG. 2 as described earlier, the correction data bits "da" to "de" are fed to the control circuit 6 so that, first, the control circuit 6 performs Y position correction among different lines on the data signals to be fed to the driving ICs "a1" to "a26." Thereafter, the data signals corrected by the control circuit 6 are subjected to Y position correction among different regions between adjacent lines which is performed by the driving ICs "a1" to "a26," to which the correction data bits "ta" to "td" are fed.

This control circuit 6 is configured as shown in FIG. 9. It is to be noted that, for simplicity's sake, FIG. 9 gives only a circuit block diagram of the portion of the control circuit 6 related to the light-emitting section #1. The portions related to the other light-emitting sections #2 to #4992 are configured in similar manners, and therefore their explanations will be omitted.

The control circuit 6 shown in FIG. 9 includes a 4,992-bit shift register 21 that takes in 4-bit data signals fed in via data input terminals SI0 to SI3, a five-stage latch circuit 22 that takes in, parallely in units of 4,992 bits, the data signals taken in by the shift register 21, a Y position correction data storage circuit 23 that stores 4,992 sets of correction data for correcting Y positions, a select circuit 24 that selects from among the data signals stored in the latch circuit 22 according to the correction data stored in the Y position correction data storage circuit 23, and a 4,992-bit shift register 25 that takes in the data signals selected by the select circuit 24.

The latch circuit 22 is composed of latch circuits 22a to 22e each capable of storing 4,992-bit data signals. In synchronism with a load signal LOAD, the 4,992-bit data signals stored in the shift register 21 are fed to the latch circuit 22a, the 4,992-bit data signals stored in the latch circuit 22a are fed to the latch circuit 22b, the 4,992-bit data signals stored in the latch circuit 22b are fed to the latch circuit 22c, the 4,992-bit data signals stored in the latch circuit 22c are fed to the latch circuit 22d, and the 4,992-bit data signals stored in the latch circuit 22d are fed to the latch circuit 22e.

Moreover, in synchronism with the load signal LOAD, the 4,992×5-bit data signals stored in all of these latch circuits 22a to 22e are fed simultaneously to the select circuit 24. The select circuit 24 thus receives 4,992×5-bit data signals, and selects therefrom 4,992-bit data signals to feed them to the driving ICs "a1" to "a26" respectively. To achieve this, the select circuit 24 includes 4,992 gate circuits each composed of five AND gates G1 to G5 and one OR gate G6.

The 4,992-bit data signals selected by the select circuit 24 are fed to the shift register 25 and are stored therein for a while. The shift register 25 feeds out the 4,992-bit data signals stored therein in units of 4 bits via the data output terminals SO0 to SO3 so as to be fed to the driving IC "a26."

Now, the operations performed with respect to the data signal for the light-emitting section #1 will be described. Five bits of correction data "da" to "de" output from the Y position correction data storage circuit 23 are fed to the five AND gates G1 to G5 respectively. These AND gates G1 to G5 also receive, one bit each, the data signals that are fed from the latch circuits 22a to 22e for the light-emitting section #1. The outputs of the AND gates G1 to G5 are fed to the OR gate G6. Thus, the OR gate G6 outputs the output of that AND gate which receives whichever of the correction data bits "da" to "de" is high. The output of the OR gate G6 is fed to the shift register 25.

The clock CLK fed in via the clock input terminal CI is fed out through a buffer B1 via the clock output terminal CO so as to be fed to the clock input terminal CI of the driving IC "a26." The load signal LOAD fed in via the load signal input terminal LI is fed out through a buffer B2 via the load signal output terminal LO so as to be fed to the load signal input terminal LI of the next driving IC "a26."

The Y position correction data storage circuit 23 is configured, for example, as a 4,992×5-bit latch circuit so as to be capable of storing 4,992 sets of correction data corresponding to the data signals, with each set of correction data consisting of 5 bit. The correction data is written to the Y position correction data storage circuit 23 in advance on the basis of signals fed parallelly in units of 4,992 bits from the shift register 21.

Specifically, the correction data stored in the memory 5 is read out by the control circuit of a printer itself or by the control circuit 6 provided within the print head, and is fed to the control circuit 6, where, with the Y position correction data storage circuit 23 alone kept in a writable state, for each data signal, one bit after another of the correction data is stored therein by repeating write operation five times. In this way, the correction data is written to the Y position correction data storage circuit 23.

Assuming that the driving IC "a" is configured as shown in FIG. 3 as described earlier, the latch circuit 12 here, as opposed to that used in the first embodiment, is composed of a signal stage of a 192-bit latch circuit that parallel receives 192-bit data signals output from the shift register 11. The select circuit 15 feeds the 192-bit data signals fed from the latch circuit 12 to the drive circuit 16 in synchronism with whichever of internal strobe signals STB1 to STB2 fed from the timing control circuit 14 is selected according to 192× 4-bit correction data fed from the Y position correction data storage circuit 13.

The Y position correction data storage circuit 13 is configured, for example, as a 192×4-bit latch circuit so as to be capable of storing 192 sets of correction data corresponding to the data signals, with each set of correction data consisting of 4 bit. The correction data is written to the Y position correction data storage circuit 13 in advance on the basis of signals fed parallelly in units of 192 bits from the shift register 11.

Specifically, the correction data "ta" to "td" stored in the memory 5 is read out by the control circuit of the printer itself or by the control circuit 6 provided within the print head, and is fed to the driving IC "a", where, with the Y position correction data storage circuit 13 alone kept in a writable state, for each data signal, one bit after another of the correction data is stored therein by repeating write operation four times. In this way, the correction data is written to the Y position correction data storage circuit 13.

Now, with reference to FIG. 10, the configuration of the driving IC "a" configured as described above will be described in more detail. It is to be noted that, for simplicity's sake, FIG. 10 gives only a circuit block diagram of the portion of the driving IC "a" related to the output terminal DO1. The portions related to the other output terminals DO2 to DO192 are configured in similar manners, and therefore their explanations will be omitted.

The latch circuit 12 is a latch circuit capable of storing 192-bit data signals. In synchronism with the load signal, the 192-bit data signals stored in the shift register 11 are fed to the latch circuit 12. Simultaneously, in synchronism with the load signal, the 192-bit data signals stored in the latch circuit 12 are fed to the select circuit 15. The select circuit 15 includes 192 gate circuits each composed of four AND gates G11 to G14 and one OR gate G15.

The select circuit 15 feeds the data signals to the drive circuit 16 in synchronism with one, at a time, of the internal strobe signals STB1 to STB4 generated by a strobe control circuit 18. To achieve this, the select circuit 15 includes 192 AND gates G7 to which the data signals output from the latch circuit 12 and the outputs of the corresponding OR gates G15 are fed respectively. The shift register 11, the drive circuit 16, the current supply circuit 17, and the strobe control circuit 18 are configured in the same manner as in the first embodiment (FIG. 4).

Specifically, four bits of correction data "ta" to "td" output from the Y position correction data storage circuit 13 are fed to the four AND gates G11 to G14. These AND gates G11 to G14 also receive respectively the internal strobe signals STB1 to STB4 generated by the strobe control circuit 18. The outputs of the AND gates G11 to G14 are fed to the OR gate G15. Thus, the OR gate G15 outputs the output of that AND gate which receives whichever of the correction data bits "ta" to "td" is high. Thus, the data signals output from the latch circuit 12 are fed through the AND gate G7 to the current amplifier 16a in synchronism with whichever of the internal strobe signals STB1 to STB4 is selected according to the correction data "ta" to "td."

Figure 11:
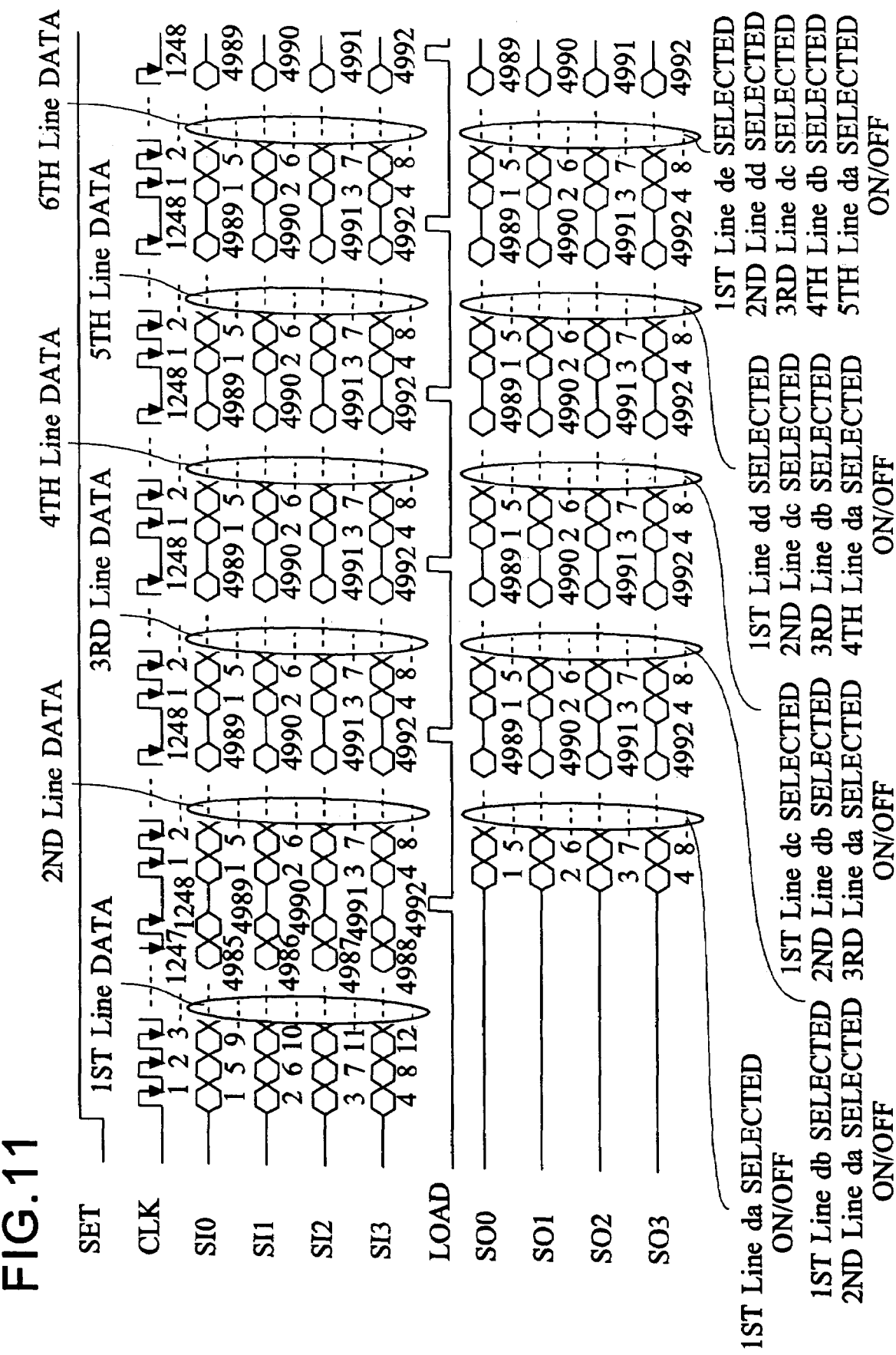
FIG. 11 is a timing chart showing the operation of the control circuit shown in FIG. 9.
Figure 12:
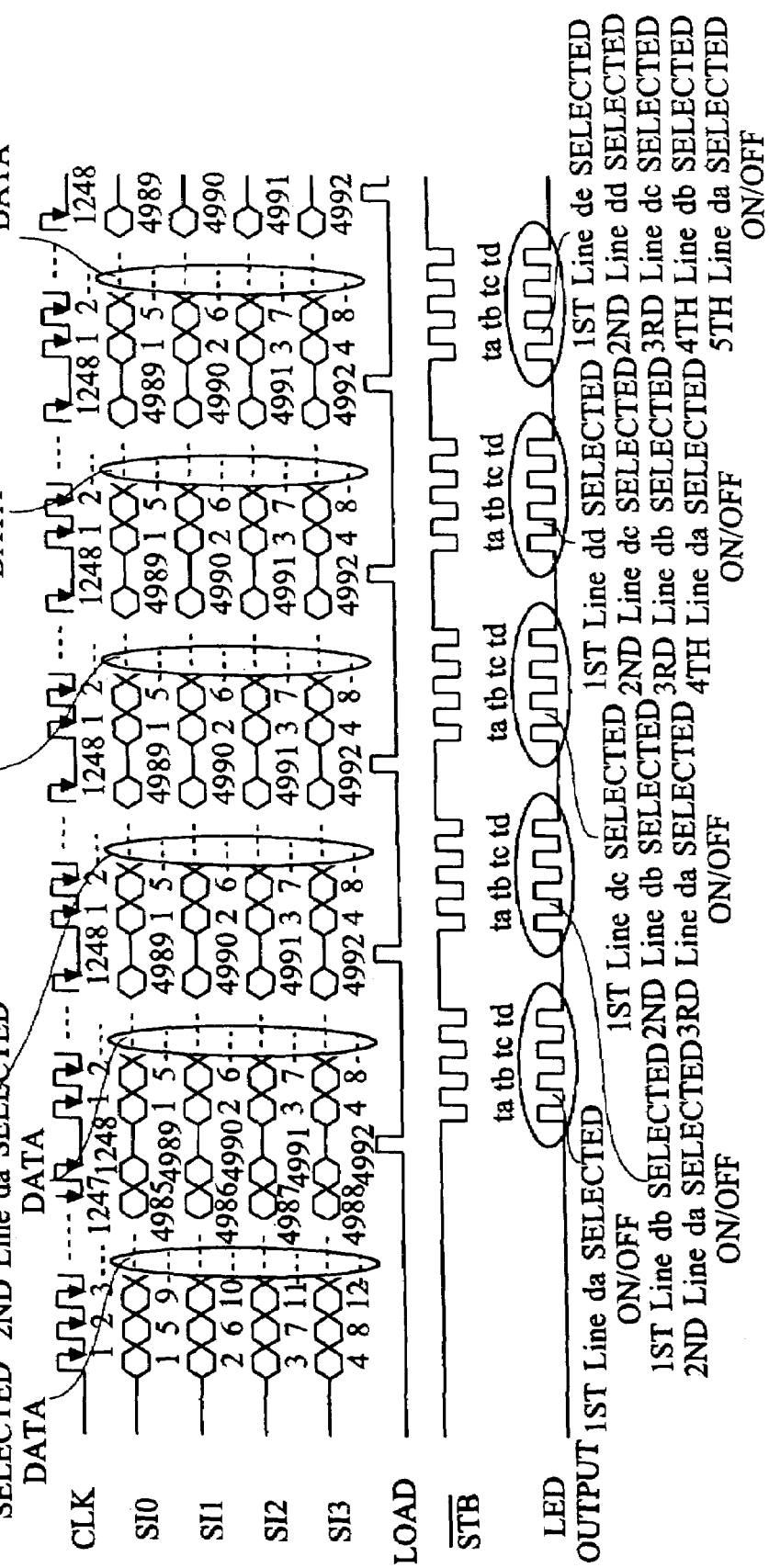
FIG. 12 is a timing chart showing the operation of the driving IC shown in FIG. 10.
Figure 13:
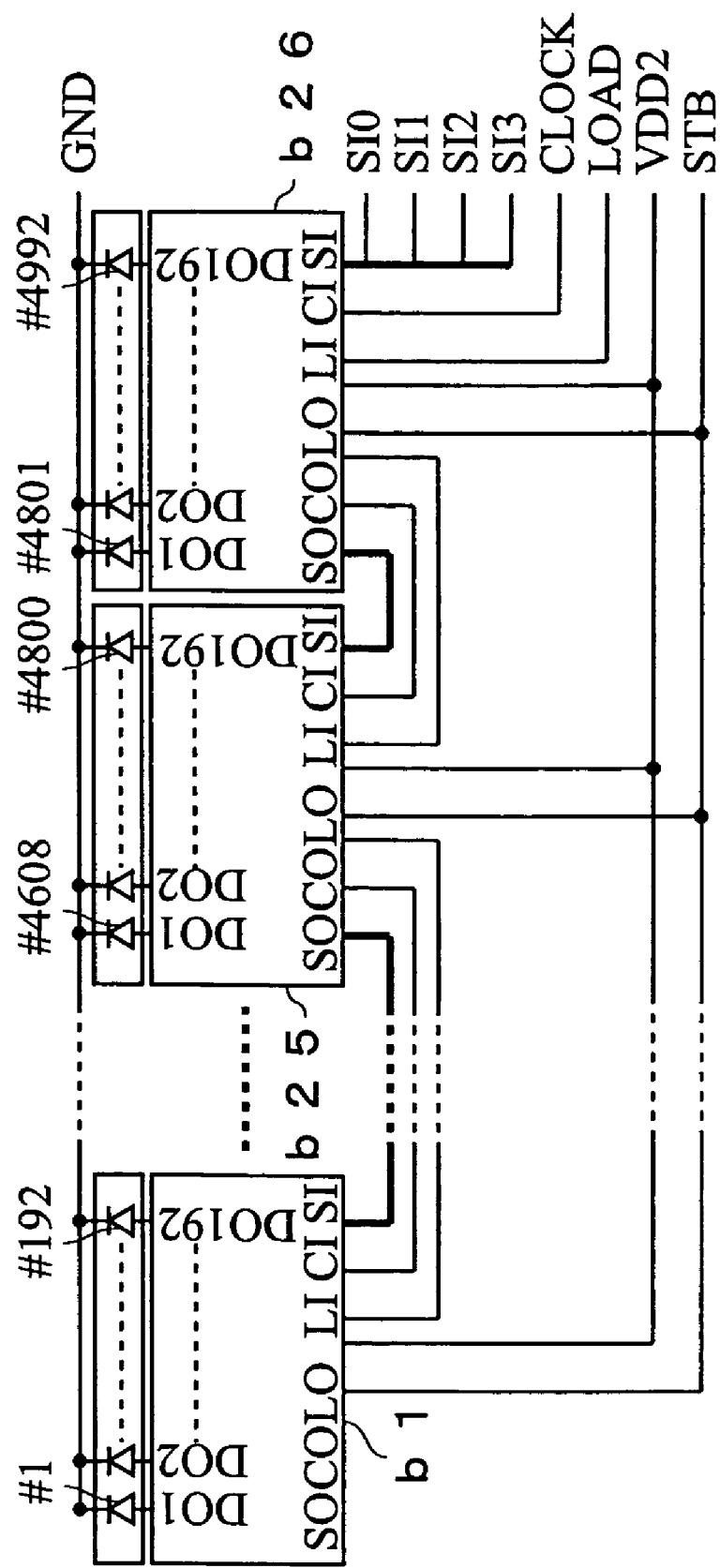
FIG. 13 is a block diagram showing the internal configuration of a conventional driving IC.
Figure 14:
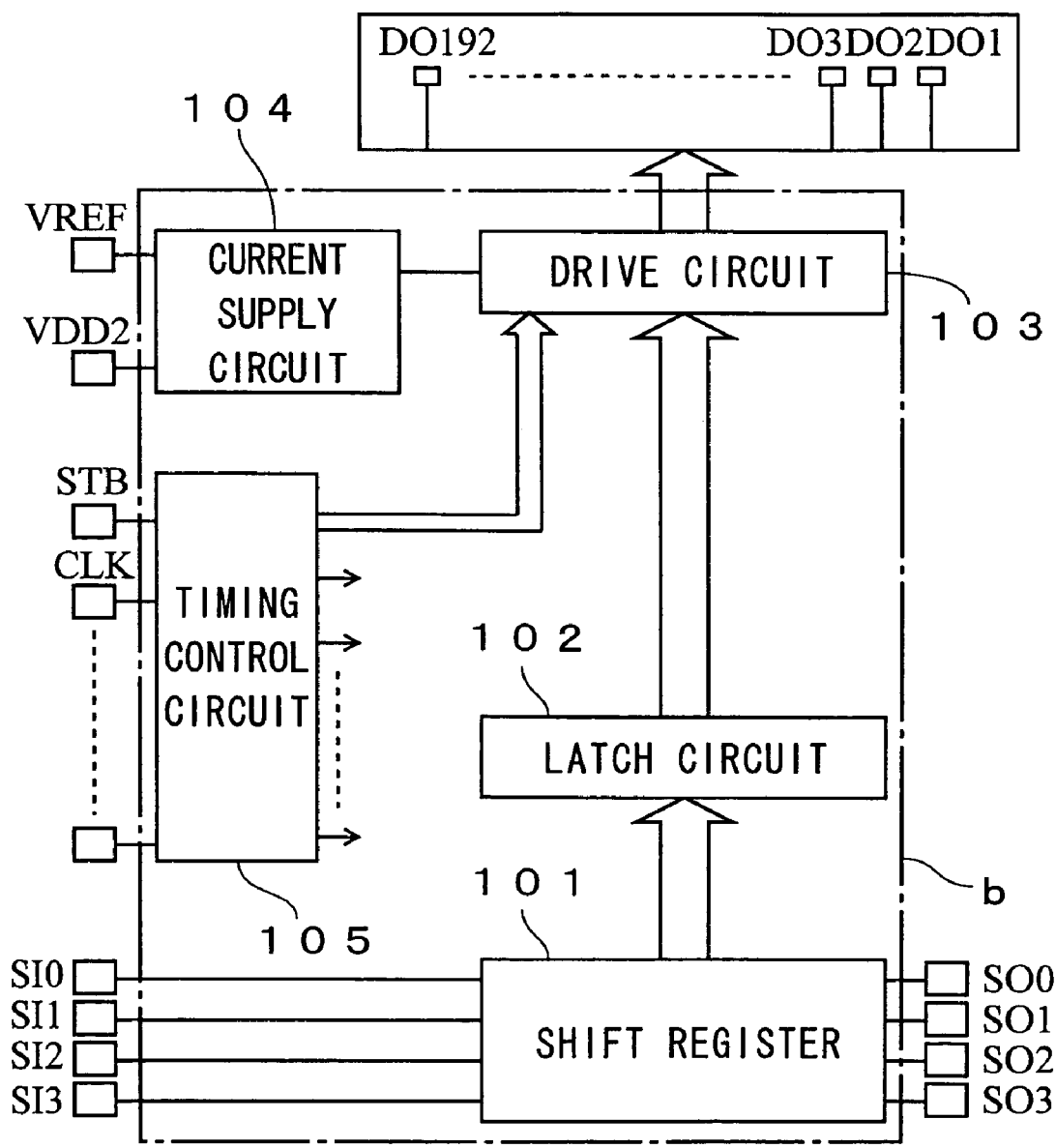
FIG. 14 is a block diagram showing the internal configuration of a conventional optical print head.
Figure 15:
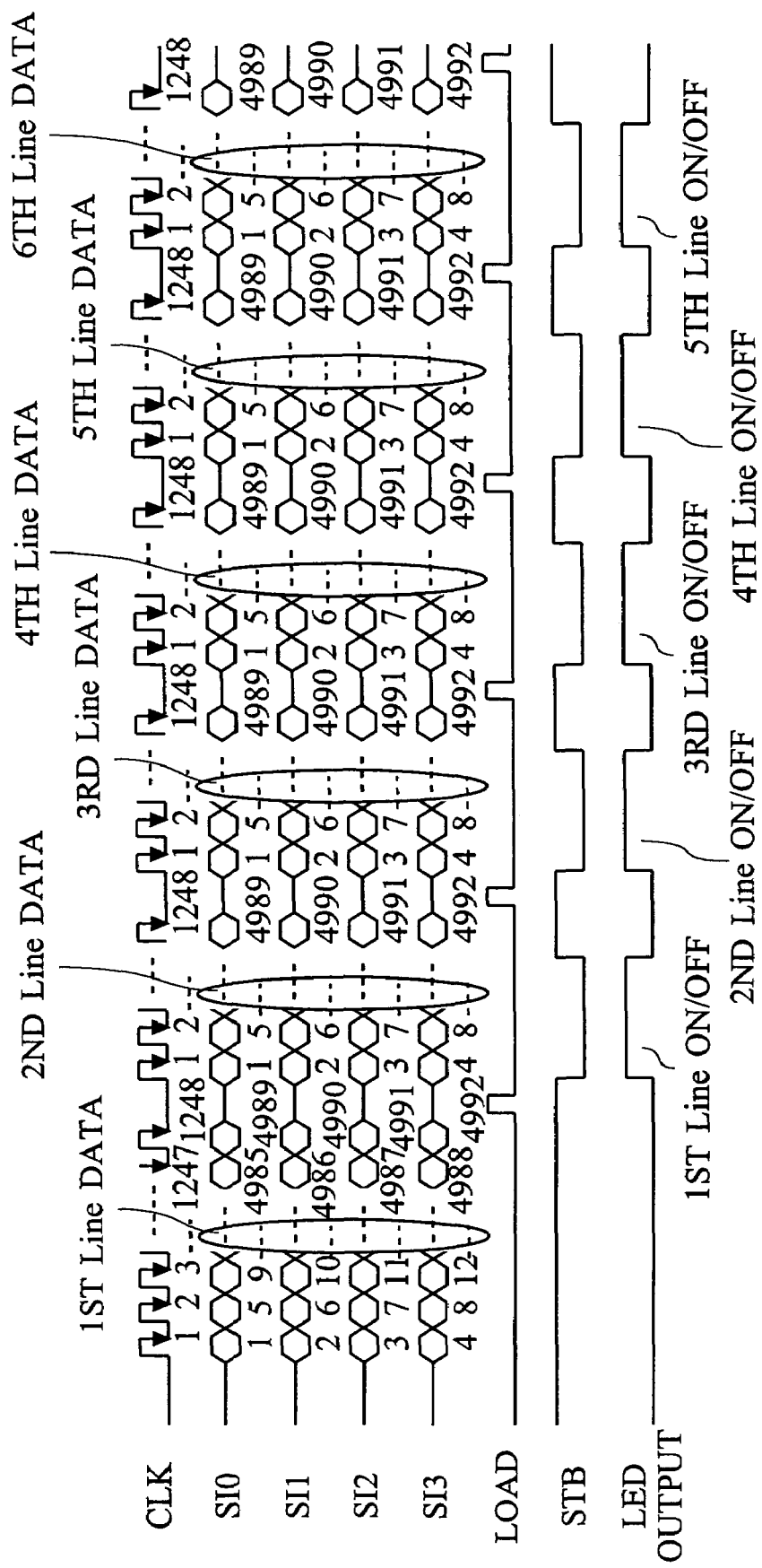
FIG. 15 is a timing chart showing the operation of a conventional optical print head.
Figure 16:
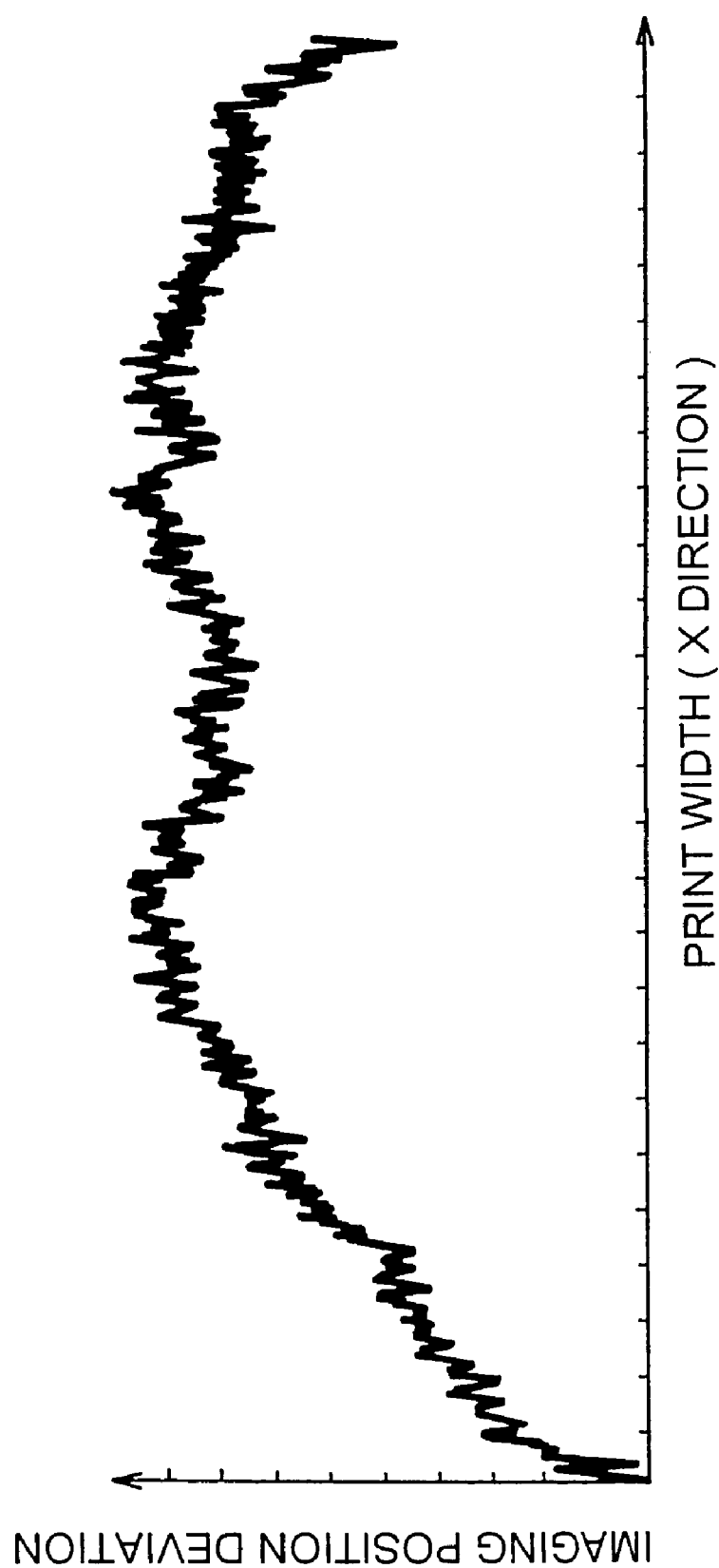
FIG. 16 is a diagram showing deviations of Y positions observed in a print made with a conventional optical print head.
Figure 17:
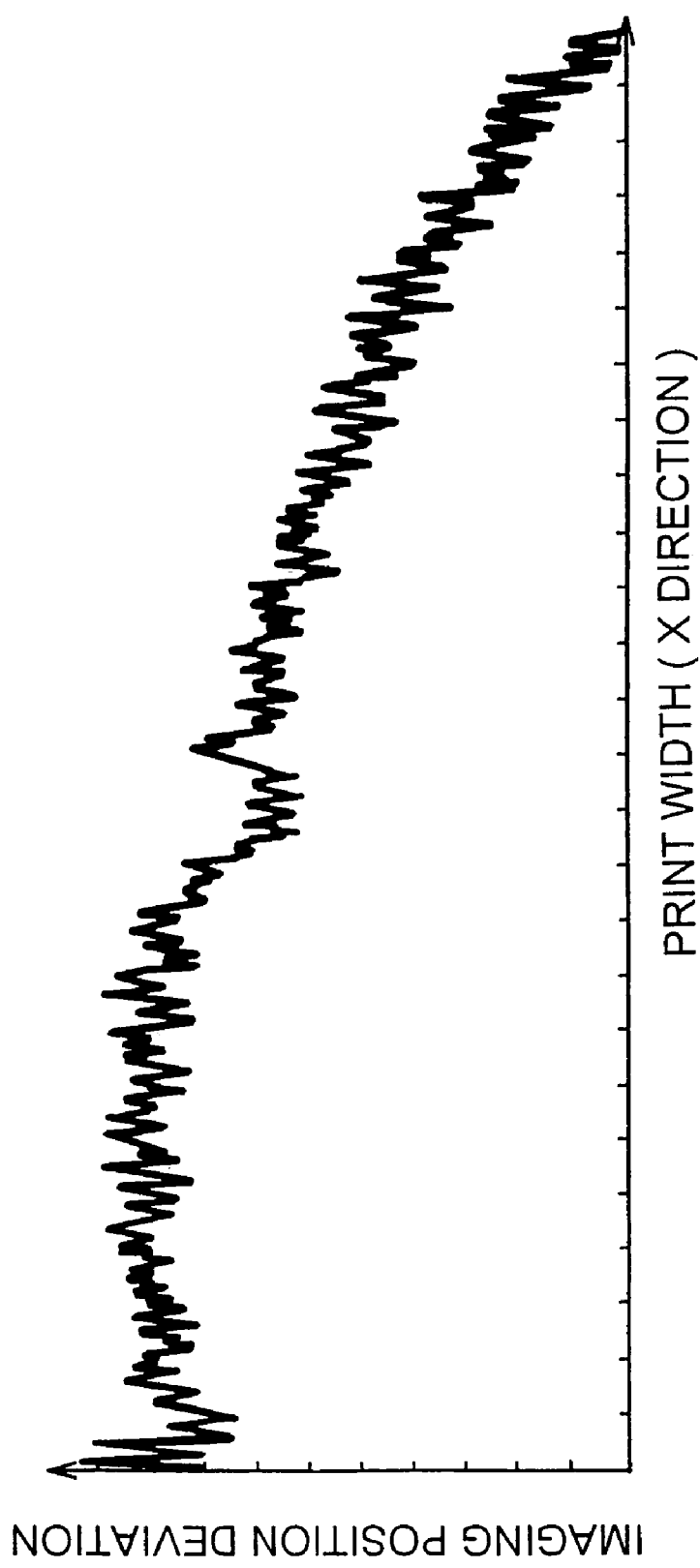
FIG. 17 is a diagram showing deviations of Y positions observed in a print made with a conventional optical print head.

Now, the operation of the optical print head incorporating the control circuit 6 and the driving ICs "a1" to "a26" each configured as described above will be described with reference to FIGS. 7A to 7E, 11, and 12. FIG. 11 is a timing chart showing the operation of the control circuit, and FIG. 12 is a timing chart showing the operation of the driving ICs.

First, the operation of the control circuit 6 will be described with reference to the timing chart shown in FIG. 11. For example, at start-up, the correction data bits "da" to "de" set in the same manner as in the first embodiment are read out from the memory 5 by the control circuit of a printer itself or by the control circuit 6 provided within the print head, and are stored, through the shift register 21, in the Y position correction data storage circuit 23. When the correction data stored in the memory 5 has previously been written to the Y position correction data storage circuit 23 in this way, first, a set signal SET turns from low to high to inhibit writing to the Y position correction data storage circuit 23.

Then, data signals corresponding to 1 line (4,992 bits) are fed in, in units of four bits and one unit after the next, and are taken in by the shift registers 21 of the control circuit 6 in synchronism with pulses in the clock CLK. When 1,248 clock pulses CLK have been fed in, the data signals corresponding to the first line are stored in the shift register 21. When the data signals of the first line have been stored in the shift register 21 in this way, the clock CLK ceases to be fed in, and a high level is fed in as the load signal LOAD.

In synchronism with the load signal LOAD, the data signals of the first line stored in the shift register 21 are written to the latch circuit 22a. The data signals written to the latch circuit 22a are fed only through the AND gates G1 to which the correction data bit "da" is fed and then through the corresponding OR gates G6 to the shift register 25. Thus, of the data signals of the first line stored in the latch circuit 22a, only those to be fed to the light-emitting sections located in the position corresponding to the correction data bit "da" (i.e., those located close to the reference position) are fed from the latch circuit 22a to the shift register 25.

Subsequently, the load signal LOAD is turned low, and then another 1,248 clock pulses CLK start being fed in. Concurrently, the data signals stored in the shift register 25 so as to be fed to the light-emitting sections located close to the reference position of the first line are fed out, in units of four bits, via the data output terminals SO0 to SO3 so as to be fed to the data input terminals SI0 to SI3 of the driving IC "a26." Thus, of the data signals corresponding to the first line, the 1st to 192nd data signals, the 193rd to 384th data signals, ..., and the 4,801st to 4,992nd data signals are stored in the shift registers 11 of the driving ICs "a1," "a2," ..., and "a26" respectively. Concurrently, the data signals corresponding to the second line are fed to the shift register 21.

Then, a high level is fed in again as the load signal LOAD. This causes the data signals of the first line stored in the latch circuit 22a to be written to the latch circuit 22b, and simultaneously the data signals of the second line stored in the shift register 11 to be written to the latch circuit 22a. The data signals of the second line thus stored in the latch circuit 22a are fed through the AND gates G1 to which the correction data bit "da" is fed and then through the corresponding OR gates G6 to the shift register 25, and the data signals of the first line stored in the latch circuit 22b are fed through the AND gates G2 to which the correction data bit "db" is fed and then through the corresponding OR gates G6 to the shift register 25.

As a result, the data signals to be fed to the light-emitting sections located close to the reference position of the second line and those to be fed to the light-emitting sections located in the position deviated one line from the reference position of the first line are stored in the shift register 25. When clock pulses CLK start being fed in again, the data signals thus stored in the shift register 25 are fed out, in units of four bits, via the data output terminals SO0 to SO3 so as to be fed to the data input terminals SI0 to SI3 of the driving IC "a26."

Thereafter, the clock CLK and the load signal LOAD repeat behaving in the manner described above and thereby achieve the following operations. First, the data signals corresponding to the third, second, and first lines are stored in the latch circuits 22a, 22b, and 22c respectively. Then, the data signals to be fed to the light-emitting sections located in positions deviated roughly two lines from the reference position of the first line, those located in position deviated roughly one line from the reference position of the second line, and those located close to the reference position of the third line are stored in the shift register 25.

Next, after the data signals stored in the shift register 25 are fed out via the data output terminals SO0 to S03 so as to be fed to the data input terminals SI0 to SI3 of the driving IC "a26," the data signals corresponding to the fourth, third, second, and first lines are stored in the latch circuits 12a, 12b, 12c, and 12d respectively. Then, the data signals to be fed to the light-emitting sections located in positions deviated roughly three lines from the reference position of the first line, those located in position deviated roughly two lines from the reference position of the second line, those located in position deviated roughly one line from the reference position of the third line, and those located close to the reference position of the fourth line are stored in the shift register 25.

Next, after the data signals stored in the shift register 25 are fed out via the data output terminals S00 to S03 so as to be fed to the data input terminals SI0 to SI3 of the driving IC "a26," the data signals corresponding to the fifth, fourth, third, second, and first lines are stored in the latch circuits 12a, 12b, 12c, 12d, and 12e respectively. Then, the data signals to be fed to the light-emitting sections located in positions deviated roughly four lines from the reference position of the first line, those located in position deviated roughly three lines from the reference position of the second line, those located in position deviated roughly two lines from the reference position of the third line, those located in position deviated roughly one line from the reference position of the fourth line, and those located close to the reference position of the fifth line are stored in the shift register 25.

The control circuit 6 repeats these operations, with the result that the driving ICs "a1" to "a26" receive data signals that have been corrected for deviations due to a Y bend among different lines. Specifically, in a case where the light-emitting sections #1 to #17 exhibit a Y bend as shown in FIG. 7A, when the shift register 25 of the control circuit 6 outputs the data signal of the first line to be fed to the light-emitting section #8, it outputs along with it the data signals of the second line to be fed to the light-emitting sections #5 to #7, #9, and #10, the data signals of the third line to be fed to the light-emitting sections #3, #4, #11, and #12, the data signals of the fourth line to be fed to the light-emitting sections #1, #2, #13, and #14, and the data signals of the fifth line to be fed to the light-emitting sections #15 to #17. Thus, when the light-emitting sections #1 to #17 are lit by the use of the data signals output from the control circuit 6, their Y bend is corrected as shown in FIG. 7C.

Next, the operation of the driving ICs "a1" to "a26" will be described with reference to the timing chart shown in FIG. 12. For example, at start-up, the correction data bits "ta" to "td" set in the same manner as in the first embodiment are read out from the memory 5 by the control circuit of the printer itself or by the control circuit 6 provided within the print head, and are stored, through the shift register 11, in the Y position correction data storage circuit 13. When the correction data stored in the memory 5 has previously been written to the Y position correction data storage circuit 13 in this way, first, the set signal SET turns from low to high to inhibit writing to the Y position correction data storage circuit 13.

Then, data signals corresponding to 1 line (4,992 bits) are fed, in units of four bits and one unit after the next, to the data input terminals SI0 to SI3 of the driving IC "a26" located at an end, and those data signals are taken in by the shift registers 11 of the driving ICs "a1" to "a26" in synchronism with pulses in the clock CLK. When the 1,248th clock pulse CLK is fed in, of the data signals selected from five consecutive lines, the 1st to 192nd data signals, the 193rd to 384th data signals, . . . , and the 4,801st to 4,992nd data signals are stored in the shift registers 11 of the driving ICs "a1," "a2," . . . , and "a26" respectively. When the data signals selected from five consecutive lines have been stored in the shift registers 11 of the driving ICs "a1" to "a26" in this way, the clock CLK ceases to be fed in, and a high level is fed in as the load signal LOAD.

In synchronism with the load signal LOAD, in each of the driving ICs "a1" to "a26," the data signals stored in the shift register 11 are written to the latch circuit 12. The data signals written to the latch circuit 12 is fed to the AND gate G7. Subsequently, the load signal LOAD is turned low, and then the clock CLK starts being fed in again at the same time that four low-level pulses are fed in as the external strobe signal (STB inverted). This causes the strobe control circuit 18 to output the internal strobe signals STB1 to STB4 in the order STB1, then STB2, then STB3, and then STB4 as described with reference to FIG. 5.

As a result, first, the internal strobe signal STB1 is fed through the AND gates G11 to which the correction data bit "ta" is fed and then through the corresponding OR gates G15 to the corresponding AND gates G7, and thus the data signals to be fed to the light-emitting sections located close to the reference position of the respective line are fed to the drive circuit 16. Next, the internal strobe signal STB2 is fed through the AND gates G12 to which the correction data bit "tb" is fed and then through the corresponding OR gates G15 to the corresponding AND gates G7. Thus, the data signals to be fed to the light-emitting sections located in the position deviated (¼)L from the reference position of the respective line are fed to the drive circuit 16.

Next, the internal strobe signal STB3 is fed through the AND gates G13 to which the correction data bit "tc" is fed and then through the corresponding OR gates G15 to the corresponding AND gates G7. Thus, the data signals to be fed to the light-emitting sections located in the position deviated (½)L from the reference position of the respective line are fed to the drive circuit 16. Lastly, the internal strobe signal STB4 is fed through the AND gates G14 to which the correction data bit "td" is fed and then through the corresponding OR gates G15 to the corresponding AND gates G7. Thus, the data signals to be fed to the light-emitting sections located in the position deviated (¾)L from the reference position of the respective line are fed to the drive circuit 16. Concurrently, in synchronism with clocks in the pulse CLK, the data signals output from the control circuit 6 are taken in by the shift register 11 of the driving IC "a."

The driving ICs "a1" to "a26" repeat these operations to control the light emission of the individual light-emitting sections #1 to #4,992 while correcting deviations due to a Y bend among different regions between adjacent lines.

Specifically, in a case where the control circuit 6 corrects the data signals fed to the light-emitting sections #1 to #17 located as shown in FIG. 7A, after the data signal of the first line to be fed to the light-emitting section #8 is fed from the control circuit 6 and stored in the latch circuit 12, first, when the strobe control circuit 18 outputs the internal strobe signal STB1, the light-emitting section #8 receives the data signal of the first line, the light-emitting sections #5 and #10 receive the data signals of the second line, the light-emitting sections #3 and #12 receive the data receive the data signals of the fourth line, and the light-emitting section #17 receives the data signal of the fifth line.

Next, when the strobe control circuit 18 outputs the internal strobe signal STB2, the light-emitting section #6 receives the data signal of the second line and the light-emitting section #16 receives the data signal of the fifth line. Next, when the strobe control circuit 18 outputs the internal strobe signal STB3, the light-emitting section #9 receives the data signal of the second line, the light-emitting sections #4 and #11 receive the data signals of the third line, and the light-emitting sections #2 and #13 receive the data signals of the fourth line. Lastly, when the strobe control circuit 18 outputs the internal strobe signal STB4, the light-emitting section #7 receives the data signal of the second line and the light-emitting section #15 receives the data signal of the fifth line.

Thus, when the light-emitting sections #1 to #17 are lit by the driving IC "a" configured as described above by the use of data signals corrected for a Y bend as shown in FIG. 7C by the control circuit 6 configured as described above, it is possible to correct the Y bend with higher accuracy as shown in FIG. 7E. Making the control circuit correct deviations due to a Y bend among different lines helps simplify the circuit configuration of the driving IC "a," and thus helps make it more compact than in the first embodiment.

In the first and second embodiments, there are provided 4,992 light-emitting sections, each driving IC has 192 output terminals, and Y positions are corrected among five lines and among four regions between adjacent lines. This should not be understood, however, to impose any restriction on those numbers. The numbers of lines and regions among which to correct Y positions may vary according to the rate at which paper is fed and the rate at which light-emitting sections are blinked. It is also possible to store in a memory a plurality of sets of correction data for different paper feed rates and different light-emitting section blink rates so that an appropriate set of correction data is read out and transferred to driving ICs, for example, at a change of print rates.

The embodiments deal with cases where individual light-emitting sections can be lit with different timing. However, the present invention is applicable also in cases where different groups of light-emitting sections are lit with different timing, or light-emitting sections belonging to different driving ICs are lit with different timing. By lighting light emitting sections with different timing on a group-by-group basis in this way, it is possible to simplify the circuit configuration of the driving IC.

The driving IC may incorporate, in addition to a Y position correction data storage circuit, a brightness correction data storage circuit for storing data previously prepared for the correction of brightness. In that case, for each light-emitting section, S bits of correction data are stored in the brightness correction data storage circuit, and, for each output terminal of the driving IC by way of which to supply current to the corresponding light-emitting section, S current amplifiers for supplying current are provided. These S current amplifiers are operated according to the S bits of correction data to achieve brightness correction.

The embodiments deal with optical print heads in which the output terminals of a driving IC are connected to light-emitting sections on a one-to-one basis. However, it is also possible, as disclosed in Japanese Patent Applications Laid-Open Nos. H6-163980 and H10-0226102, to divide n light-emitting sections into m groups in such a way that the light-emitting sections belonging to one group have one end thereof connected together to a common electrode and that m light-emitting sections belonging to the m different groups have the other end thereof connected together to an individual electrode. In this case, the output terminals of the driving IC are accordingly divided into two groups, namely a group of those connected to common electrodes and a group of those connected to individual electrodes. In this way, the optical print head can be driven on a time-division basis.

Where data signals each consist of a plurality of bits or in other cases, the configurations of shift registers, latch circuits, and other circuits may be modified. For example, a shift register may be configured as a memory of which given portions can be accessed on the basis of addresses.

INDUSTRIAL APPLICABILITY

As described above, in a driving IC embodying the present invention, according to deviations of the imaging positions of a plurality of light-emitting sections of a light-emitting device provided in an optical print head, the timing with which the individual light-emitting sections are lit is varied. An optical print head incorporating such a driving IC can perform printing with improved linearity. Accordingly, a tandem-type printer incorporating a plurality of optical print heads embodying the present invention can perform color printing with smaller color displacements. Moreover, for every print line, different strobe signals are produced with different timing so that the individual light-emitting sections are lit in synchronism with whichever of the strobe signals is appropriate according to deviations of the imaging positions of the light-emitting sections. This makes it possible to fine-tune the obtained linearity and thereby achieve highly accurate correction.

Moreover, linearity can be improved with almost no mechanical or optical adjustment as practiced conventionally. This helps greatly reduce the trouble and time required for assembly, and helps eliminate the need for strict sorting-out of acceptable components, such as lenses and light-emitting devices, from unusable ones. Thus, it is possible to realize high-quality but inexpensive optical print heads and printers incorporating them.

The invention claimed is:

1. A driving IC for driving elements, comprising:
   a drive circuit that produces drive signals for driving n elements based on n data signals constituting a group of data signals;
   x-stage latch circuits (where x is an integer equal to or greater than 2) that each store one of x groups of data signals and that are connected in series with one another;
   a strobe control circuit that produces y strobe signals for determining timing with which data signals corresponding to the individual elements are fed to the drive circuit; and
   a select circuit that selects the data signals corresponding to the individual elements from the x-stage latch circuits to produce one group of data signals from the n data signals, and that feeds the individual data signals constituting that one group of data signals to the drive circuit in synchronism with the y strobe signals fed from the strobe control circuit.

2. A driving IC as claimed in claim 1, further comprising:
a shift register that receives the n data signals in units of m data signals and that then feeds the n data signals in parallel to a first-stage latch circuit among the x-stage latch circuits,
wherein each of the first through (x−1)th-stage latch circuit respectively feeds n data signals in parallel to the second through xth-stage latch circuit.

3. A driving IC as claimed in claim 1, further comprising:
a storage circuit that stores drive timing with which the individual elements are driven,
wherein, according to the drive timing stored in the storage circuit, the n data signals are selected from the x-stage latch circuits and timing with which the n data signals thus selected are individually fed to the drive circuit is determined.

4. A driving IC as claimed in claim 1,
wherein the n elements are n light-emitting sections constituting a light-emitting device and arranged in an array, and
wherein, based on imaging positions of the individual light-emitting sections in a direction perpendicular to a direction in which the n light-emitting sections are arranged, the select circuit determines from which of the x-stage latch circuits to select the data signals corresponding to the light-emitting sections and with what timing to feed those data signals to the drive circuit.

5. A driving IC as claimed in claim 1,
wherein the driving IC is for driving a plurality of light-emitting sections of a light-emitting device provided in an optical print head, and
wherein, assuming that a print direction of a printer incorporating the optical print head is from up to down and that an imaging position of a light-emitting section located in a lowest position among the plurality of light-emitting sections is used as a reference position, the farther are imaging positions of the light-emitting sections away from the reference position in the print direction, the later are the stages of the latch circuits from which the corresponding data signals are selected.

6. A driving IC as claimed in claim 5,
wherein the y strobe signals recur every period allotted to a print line.

7. A driving IC as claimed in claim 6,
wherein, the farther are the imaging positions of the light-emitting sections away from a print line located below but closest to the imaging positions in the print direction, the later within a period allotted to that print line are the strobe signals in synchronism with which the corresponding data signals are fed to the drive circuit to drive the drive circuit.

8. An optical print head comprising:
a light-emitting device having n light-emitting sections; n terminals connected one-to-one to the n light-emitting sections of the light-emitting device; and
a driving IC including:
  a drive circuit that produces drive signals for driving the n light-emitting sections based on n data signals constituting a group of data signals and that then feeds the produced drive signals via the n terminals to the n light-emitting sections;
  a strobe control circuit that produces y strobe signals recurring every period allotted to a print line for determining timing with which data signals corresponding to the individual light-emitting sections are fed to the drive circuit; and
  a select circuit that selects one of the y strobe signals fed, one for each of the data signals constituting that one group of data signals and corresponding to the light-emitting sections, from the strobe control circuit so that each of the data signals constituting that one group of data signals is fed to the drive circuit in synchronism with the strobe signal selected therefor.

9. An optical print head as claimed in claim 8, further comprising:
a memory that stores drive timing with which the individual light-emitting sections are driven as determined based on imaging positions of the light-emitting sections in a direction perpendicular to a direction in which the n light-emitting sections are arranged,
wherein the driving IC further includes a storage circuit that stores the drive timing read out from the memory, and
wherein, according to the drive timing stored in the storage circuit, the driving IC determines timing with which the n data signals selected by the control circuit are individually fed to the drive circuit.

10. An optical print head as claimed in claim 9,
wherein the drive timing is determined in such a way that, assuming that a print direction of a printer incorporating the optical print head is from up to down and that an imaging position of a light-emitting section located in a lowest position among the plurality of light-emitting sections is used as a reference position, the farther are the imaging positions of the light-emitting sections away from the reference position, the later within a period allotted to a print line are the strobe signals in synchronism with which the corresponding data signals are fed to the drive circuit to drive the drive circuit.

11. An optical print head comprising:
a light-emitting device having n light-emitting sections; and
a driving IC including:
  a drive circuit that produces drive signals for driving the n light-emitting devices based on n data signals constituting a group of data signals;
  x-stage latch circuits (where x is an integer equal to or greater than 2) that each store one of x groups of data signals and that are connected in series with one another;
  a strobe control circuit that produces y strobe signals for determining timing with which data signals corresponding to the individual light-emitting devices are fed to the drive circuit; and
  a select circuit that selects the data signals corresponding to the individual light-emitting devices from the x-stage latch circuits to produce one group of data signals from the n data signals, and that feeds the individual data signals constituting that one group of data signals to the drive circuit in synchronism with the y strobe signals fed from the strobe control circuit.

12. An optical print head as claimed in claim 11,
wherein the driving IC further includes a shift register that receives the n data signals in units of m data signals and that then feeds the n data signals in parallel to a first-stage latch circuit, and
wherein each of the first through (x−1)th-stage latch circuits respectively feeds n data signals in parallel to the second through xth-stage latch circuit.

13. An optical print head as claimed in claim 11, further comprising:

a memory that stores drive timing with which the individual light-emitting sections are driven as determined based on imaging positions of the light-emitting sections in a direction perpendicular to a direction in which the n light-emitting sections are arranged, wherein the driving IC further includes a storage circuit that stores the drive timing read out from the memory, and wherein, according to the drive timing stored in the storage circuit, the n data signals are selected from the x-stage latch circuits and timing with which the n data signals thus selected are individually fed to the drive circuit is determined.

14. An optical print head as claimed in claim 13, wherein the drive timing is determined in such a way that, assuming that a print direction of a printer incorporating the optical print head is from up to down and that an imaging position of a light-emitting section located in a lowest position among the plurality of light-emitting sections is used as a reference position, the farther are the imaging positions of the light-emitting sections away from the reference position in the print direction, the later are the stages of the latch circuits from which the corresponding data signals are selected.

15. An optical print head as claimed in claim 14, wherein the y strobe signals recur every period allotted to a print line, and wherein, the farther are the imaging positions of the light-emitting sections away from a print line located below but closest to the imaging positions in the print direction, the later within a period allotted to that print line are the strobe signals in synchronism with which the corresponding data signals are fed to the drive circuit to drive the drive circuit.

16. An optical print head comprising:

a light-emitting device having n light-emitting sections;

a control circuit including:

x-stage latch circuits (where x is an integer equal to or greater than 2) that each store one of x groups of data signals, each group consisting of n data signals, and that are connected in series with one another;

a select circuit that selects data signals corresponding to the light-emitting sections from the x-stage latch circuits and that forms one group of data signals from the thus selected n data signals; and a shift register that temporarily stores the data signals selected by the select circuit and that sequentially feeds out those data signals; and a driving IC having a drive circuit that produces drive signals for driving the n light emitting sections based on the n data signals constituting that one group of data signals fed from the control circuit.

17. An optical print head as claimed in claim 16, further comprising:

a memory that stores drive timing with which the individual light-emitting sections are driven as determined based on imaging positions of the light-emitting sections in a direction perpendicular to a direction in which the n light-emitting sections are arranged, wherein the control circuit further includes a storage circuit that stores the drive timing read out from the memory; and wherein the control circuit selects the n data signals from the x-stage latch circuits according to the drive timing stored in the storage circuit.

18. An optical print head as claimed in claim 17, wherein the drive timing is determined in such a way that, assuming that a print direction of a printer incorporating the optical print head is from up to down and that an imaging position of a light-emitting section located in a lowest position among the plurality of light-emitting sections is used as a reference position, the farther are the imaging positions of the light-emitting sections away from the reference position in the print direction, the latter are the stages of the latch circuits from which the corresponding data signals are selected.

* * * * *